(12) United States Patent
Radtke et al.

(10) Patent No.: US 7,895,531 B2
(45) Date of Patent: Feb. 22, 2011

(54) FLOATING COMMAND OBJECT

(75) Inventors: Roland Radtke, Seattle, WA (US); Jesse Clay Satterfield, Seattle, WA (US); Jensen M. Harris, Kirkland, WA (US); Mark A. Peters, Seattle, WA (US); Deepak Menon, Redmond, WA (US); Mark A. Ligameri, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 234 days.

(21) Appl. No.: 11/151,686

(22) Filed: Jun. 13, 2005

(65) Prior Publication Data
US 2006/0036946 A1 Feb. 16, 2006

Related U.S. Application Data

(60) Provisional application No. 60/601,815, filed on Aug. 16, 2004.

(51) Int. Cl.
G06F 3/048 (2006.01)

(52) U.S. Cl. ............................. 715/810; 715/842

(58) Field of Classification Search .............. 715/842, 715/705, 711, 808, 810
See application file for complete search history.

(56) References Cited

U.S. PATENT DOCUMENTS

| 4,823,283 A | 4/1989 | Diehm et al. .............. 715/825 |
| 5,155,806 A | 10/1992 | Hoeber et al. ............. 715/711 |
| 5,247,438 A | 9/1993 | Subas et al. ................ 700/90 |
| 5,323,314 A | 6/1994 | Baber et al. .................. 705/8 |
| 5,377,354 A | 12/1994 | Scannell et al. ............ 718/103 |
| 5,500,936 A | 3/1996 | Allen et al. ............... 395/156 |
| 5,519,606 A | 5/1996 | Frid-Nielsen et al. ......... 705/9 |
| 5,559,875 A | 9/1996 | Bieselin et al. ......... 379/202.01 |
| 5,559,944 A | 9/1996 | Ono .......................... 715/841 |
| 5,570,109 A | 10/1996 | Jenson ....................... 715/823 |
| 5,588,107 A | 12/1996 | Bowden et al. ............ 715/828 |
| 5,596,694 A | 1/1997 | Capps ....................... 345/473 |
| 5,625,783 A | 4/1997 | Ezekiel et al. ............. 395/352 |

(Continued)

FOREIGN PATENT DOCUMENTS

EP     0 910 007     4/1999

(Continued)

OTHER PUBLICATIONS

Microsoft Office Word 2003. Part of Microsoft Office Professional Edition 2003. Copyright 1983-2003 Microsoft Corporation.*

(Continued)

Primary Examiner—Kieu Vu
Assistant Examiner—Omar Abdul-Ali
(74) Attorney, Agent, or Firm—Merchant & Gould

(57) ABSTRACT

A floating command object is provided for offering a set of commonly or frequently used commands in close proximity to a selected text, data or other object in a document. When a given object is selected for editing, the floating object automatically displays near the object to allow easy selection of relevant commands such as formatting property commands. The object remains displayed to allow multiple command selections until it is closed by user action. If a mouse or touchpad pointer is moved away from the displayed object, the displayed object becomes increasingly translucent to visually deemphasize the relevance of the object to the new position of the pointer.

18 Claims, 10 Drawing Sheets

U.S. PATENT DOCUMENTS

| | | | | |
|---|---|---|---|---|
| 5,634,100 | A | 5/1997 | Capps | 705/9 |
| 5,634,128 | A | 5/1997 | Messina | 710/200 |
| 5,638,504 | A | 6/1997 | Scott et al. | 715/202 |
| 5,644,737 | A | 7/1997 | Tuniman et al. | 715/810 |
| 5,659,693 | A | 8/1997 | Hansen et al. | 715/779 |
| 5,664,127 | A | 9/1997 | Anderson et al. | 715/776 |
| 5,664,208 | A | 9/1997 | Pavley et al. | 715/209 |
| 5,673,403 | A | 9/1997 | Brown et al. | 715/744 |
| 5,721,847 | A | 2/1998 | Johnson | 395/333 |
| 5,734,915 | A | 3/1998 | Roewer | 395/773 |
| 5,760,768 | A | 6/1998 | Gram | 345/333 |
| 5,760,773 | A * | 6/1998 | Berman et al. | 715/808 |
| 5,761,646 | A | 6/1998 | Frid-Nielsen et al. | 705/9 |
| 5,778,402 | A | 7/1998 | Gipson | 707/530 |
| 5,778,404 | A * | 7/1998 | Capps et al. | 715/531 |
| 5,805,167 | A * | 9/1998 | van Cruyningen | 715/808 |
| 5,812,132 | A | 9/1998 | Goldstein | 715/797 |
| 5,821,936 | A | 10/1998 | Shaffer et al. | 715/810 |
| 5,828,376 | A | 10/1998 | Solimene et al. | 715/821 |
| 5,838,321 | A | 11/1998 | Wolf | 345/343 |
| 5,842,009 | A | 11/1998 | Borovoy et al. | 707/1 |
| 5,844,558 | A | 12/1998 | Kumar et al. | 345/339 |
| 5,844,572 | A | 12/1998 | Schott | 345/440 |
| 5,855,006 | A | 12/1998 | Huemoeller et al. | 705/9 |
| 5,873,108 | A | 2/1999 | Goyal et al. | 715/203 |
| 5,885,006 | A | 3/1999 | Sheedy | 384/192 |
| 5,893,073 | A | 4/1999 | Kasso et al. | 705/8 |
| 5,893,125 | A | 4/1999 | Shostak | 715/206 |
| 5,898,436 | A | 4/1999 | Stewart et al. | 345/354 |
| 5,899,979 | A | 5/1999 | Miller et al. | 705/9 |
| 5,905,863 | A | 5/1999 | Knowles et al. | 709/206 |
| 5,926,806 | A | 7/1999 | Marshall et al. | 707/3 |
| 5,936,625 | A | 8/1999 | Kahl et al. | 715/775 |
| 5,937,160 | A | 8/1999 | Davis et al. | 709/203 |
| 5,940,078 | A | 8/1999 | Nagarajayya et al. | 345/346 |
| 5,940,847 | A | 8/1999 | Fein et al. | 707/540 |
| 5,943,051 | A | 8/1999 | Onda et al. | 715/786 |
| 5,960,406 | A | 9/1999 | Rasansky et al. | 705/9 |
| 5,970,466 | A | 10/1999 | Detjen et al. | 705/8 |
| 5,999,938 | A | 12/1999 | Bliss et al. | 707/102 |
| 6,008,806 | A | 12/1999 | Nakajima et al. | 345/335 |
| 6,012,075 | A | 1/2000 | Fein et al. | 707/540 |
| 6,016,478 | A | 1/2000 | Zhang et al. | 705/9 |
| 6,018,343 | A | 1/2000 | Wang et al. | 345/356 |
| 6,034,683 | A | 3/2000 | Mansour et al. | 715/764 |
| 6,038,542 | A | 3/2000 | Ruckdashel | 705/9 |
| 6,067,087 | A | 5/2000 | Krauss et al. | 715/762 |
| 6,072,492 | A | 6/2000 | Schagen et al. | 715/733 |
| 6,085,206 | A | 7/2000 | Domini et al. | 707/533 |
| 6,101,480 | A | 8/2000 | Conmy et al. | 705/9 |
| 6,133,915 | A | 10/2000 | Arcuri et al. | 715/779 |
| 6,175,363 | B1 | 1/2001 | Williams et al. | 345/334 |
| 6,188,403 | B1 | 2/2001 | Sacerdoti et al. | 715/764 |
| 6,192,381 | B1 | 2/2001 | Stiegemeier et al. | 707/505 |
| 6,211,879 | B1 | 4/2001 | Soohoo | 345/357 |
| 6,216,122 | B1 | 4/2001 | Elson | 707/3 |
| 6,219,670 | B1 | 4/2001 | Mocek et al. | 707/102 |
| 6,222,540 | B1 | 4/2001 | Sacerdoti | 345/440 |
| 6,232,971 | B1 | 5/2001 | Haynes | 345/340 |
| 6,236,396 | B1 | 5/2001 | Jenson et al. | 715/764 |
| 6,256,628 | B1 | 7/2001 | Dobson et al. | 707/6 |
| 6,269,341 | B1 | 7/2001 | Redcay, Jr. | 705/8 |
| 6,278,450 | B1 | 8/2001 | Arcuri et al. | 345/334 |
| 6,289,317 | B1 | 9/2001 | Peterson | 705/7 |
| 6,307,544 | B1 | 10/2001 | Harding | 715/709 |
| 6,323,883 | B1 | 11/2001 | Minoura et al. | 715/784 |
| 6,326,962 | B1 | 12/2001 | Szabo | 715/762 |
| 6,327,046 | B1 | 12/2001 | Miyamoto et al. | 358/1.15 |
| 6,353,451 | B1 | 3/2002 | Teibel et al. | 345/803 |
| 6,359,634 | B1 | 3/2002 | Cragun et al. | 715/777 |
| 6,373,507 | B1 | 4/2002 | Camara et al. | 345/825 |
| 6,384,849 | B1 | 5/2002 | Morcos et al. | 715/810 |
| 6,405,216 | B1 | 6/2002 | Minnaert et al. | 707/104.1 |
| 6,424,829 | B1 | 7/2002 | Kraft | 455/412.1 |
| 6,429,882 | B1 | 8/2002 | Abdelnur et al. | 345/763 |
| 6,433,801 | B1 | 8/2002 | Moon et al. | 345/840 |
| 6,442,527 | B1 | 8/2002 | Worthington | 705/8 |
| 6,456,304 | B1 | 9/2002 | Angiulo et al. | 345/779 |
| 6,459,441 | B1 | 10/2002 | Perroux et al. | 345/837 |
| 6,466,236 | B1 | 10/2002 | Pivowar et al. | 715/835 |
| 6,469,722 | B1 | 10/2002 | Kinoe et al. | 345/837 |
| 6,480,865 | B1 | 11/2002 | Lee et al. | 715/523 |
| 6,493,006 | B1 | 12/2002 | Gourdol et al. | 715/825 |
| 6,493,731 | B1 | 12/2002 | Jones et al. | 707/501.1 |
| 6,546,417 | B1 | 4/2003 | Baker | 709/206 |
| 6,570,596 | B2 * | 5/2003 | Frederiksen | 715/808 |
| 6,578,192 | B1 | 6/2003 | Boehme et al. | 717/115 |
| 6,583,798 | B1 | 6/2003 | Hoek et al. | 345/822 |
| 6,618,732 | B1 | 9/2003 | White et al. | 707/103 |
| 6,621,504 | B1 | 9/2003 | Nadas et al. | 715/723 |
| 6,621,508 | B1 | 9/2003 | Shiraishi et al. | 715/810 |
| 6,635,089 | B1 | 10/2003 | Burkett et al. | 715/513 |
| 6,664,983 | B2 | 12/2003 | Ludolph | 715/775 |
| 6,680,749 | B1 | 1/2004 | Anderson et al. | 348/231.99 |
| 6,686,938 | B1 | 2/2004 | Jobs et al. | 345/835 |
| 6,691,281 | B1 | 2/2004 | Sorge et al. | 715/503 |
| 6,708,205 | B2 | 3/2004 | Sheldon et al. | 709/206 |
| 6,727,919 | B1 | 4/2004 | Reder et al. | 715/810 |
| 6,732,330 | B1 | 5/2004 | Claussen et al. | 715/513 |
| 6,734,880 | B2 | 5/2004 | Chang et al. | 715/738 |
| 6,750,890 | B1 | 6/2004 | Sugimoto | 715/838 |
| 6,785,868 | B1 | 8/2004 | Raff | 715/530 |
| 6,825,859 | B1 | 11/2004 | Severenuk et al. | 345/764 |
| 6,826,729 | B1 | 11/2004 | Giesen et al. | 715/837 |
| 6,850,255 | B2 | 2/2005 | Muschetto | 715/788 |
| 6,871,195 | B2 | 3/2005 | Ryan et al. | 706/46 |
| 6,882,354 | B1 * | 4/2005 | Nielsen | 715/784 |
| 6,904,449 | B1 | 6/2005 | Quinones | 709/203 |
| 6,906,717 | B2 | 6/2005 | Couckuyt et al. | 345/440 |
| 6,915,492 | B2 | 7/2005 | Kurtenbach et al. | 715/810 |
| 6,924,797 | B1 | 8/2005 | MacPhail | 345/326 |
| 6,964,025 | B2 | 11/2005 | Angiulo | 715/838 |
| 6,983,889 | B2 | 1/2006 | Alles | 236/49.1 |
| 6,988,241 | B1 | 1/2006 | Guttman et al. | 715/503 |
| 6,990,637 | B2 | 1/2006 | Anthony et al. | 715/851 |
| 7,027,463 | B2 | 4/2006 | Mathew et al. | |
| 7,032,210 | B2 | 4/2006 | Alloing et al. | 717/106 |
| 7,039,596 | B1 | 5/2006 | Lu | 705/8 |
| 7,046,848 | B1 | 5/2006 | Olcott | 382/176 |
| 7,107,544 | B1 | 9/2006 | Luke | 715/752 |
| 7,110,936 | B2 | 9/2006 | Hiew et al. | 703/22 |
| 7,111,238 | B1 | 9/2006 | Kuppusamy et al. | |
| 7,152,207 | B1 | 12/2006 | Underwood et al. | 715/526 |
| 7,181,697 | B2 | 2/2007 | Tai et al. | 715/779 |
| 7,188,073 | B1 | 3/2007 | Tam et al. | 705/9 |
| 7,212,208 | B2 | 5/2007 | Khozai | 345/440 |
| 7,216,301 | B2 | 5/2007 | Moehrle | 715/811 |
| 7,219,305 | B2 | 5/2007 | Jennings | 715/761 |
| 7,240,323 | B1 | 7/2007 | Desai et al. | 717/100 |
| 7,249,325 | B1 | 7/2007 | Donaldson | 715/777 |
| 7,325,204 | B2 | 1/2008 | Rogers | 715/792 |
| 7,328,409 | B2 | 2/2008 | Awada et al. | 715/765 |
| 7,337,185 | B2 | 2/2008 | Ellis et al. | 707/102 |
| 7,346,705 | B2 | 3/2008 | Hullot et al. | 709/238 |
| 7,346,769 | B2 | 3/2008 | Forlenza et al. | 713/151 |
| 7,386,535 | B1 | 6/2008 | Kalucha et al. | |
| 7,386,835 | B1 | 6/2008 | Desai et al. | 717/117 |
| 7,392,249 | B1 | 6/2008 | Harris et al. | 707/5 |
| 7,395,221 | B2 | 7/2008 | Doss et al. | 705/9 |
| 7,395,500 | B2 | 7/2008 | Whittle et al. | |
| 7,421,660 | B2 | 9/2008 | Charnock et al. | 715/751 |
| 7,469,385 | B2 | 12/2008 | Harper et al. | |
| 7,472,117 | B2 | 12/2008 | Dettinger et al. | 1/1 |
| 7,505,954 | B2 | 3/2009 | Heidloff et al. | 707/1 |

| Patent/Publication No. | Date | Inventor | Class |
|---|---|---|---|
| 7,530,029 B2 | 5/2009 | Satterfield et al. | 715/779 |
| 7,555,707 B1 | 6/2009 | Labarge et al. | 715/234 |
| 7,567,964 B2 | 7/2009 | Brice et al. | 707/9 |
| 7,627,561 B2 | 12/2009 | Pell et al. | 707/3 |
| 7,703,036 B2 | 4/2010 | Satterfield et al. | 715/777 |
| 7,707,255 B2 | 4/2010 | Satterfield et al. | 709/206 |
| 7,711,742 B2 | 5/2010 | Bennett et al. | 707/759 |
| 7,716,593 B2 | 5/2010 | Durazo et al. | 715/752 |
| 7,739,259 B2 | 6/2010 | Hartwell et al. | 707/706 |
| 7,747,966 B2 | 6/2010 | Leukart et al. | 715/792 |
| 2001/0035882 A1 | 11/2001 | Stoakley et al. | 715/779 |
| 2002/0007380 A1 | 1/2002 | Bauchot et al. | 707/530 |
| 2002/0037754 A1 | 3/2002 | Hama et al. | 455/566 |
| 2002/0052721 A1 | 5/2002 | Ruff et al. | 703/1 |
| 2002/0070977 A1 | 6/2002 | Morcos et al. | 345/810 |
| 2002/0075330 A1 | 6/2002 | Rosenzweig et al. | 345/854 |
| 2002/0078143 A1 | 6/2002 | DeBoor et al. | |
| 2002/0083054 A1 | 6/2002 | Peltonen et al. | 707/5 |
| 2002/0091697 A1 | 7/2002 | Huang et al. | 707/10 |
| 2002/0091739 A1 | 7/2002 | Ferlitsch et al. | 707/526 |
| 2002/0122071 A1 | 9/2002 | Camara et al. | |
| 2002/0133557 A1 | 9/2002 | Winarski | 709/207 |
| 2002/0135621 A1 | 9/2002 | Angiulo et al. | 345/838 |
| 2002/0140731 A1 | 10/2002 | Subramaniam et al. | 345/762 |
| 2002/0140740 A1 | 10/2002 | Chen | |
| 2002/0149623 A1 | 10/2002 | West et al. | 345/765 |
| 2002/0149629 A1 | 10/2002 | Craycroft et al. | 345/861 |
| 2002/0154178 A1 | 10/2002 | Barnett et al. | 715/853 |
| 2002/0163538 A1 | 11/2002 | Shteyn | 345/752 |
| 2002/0175955 A1 | 11/2002 | Gourdol et al. | 345/821 |
| 2002/0196293 A1 | 12/2002 | Suppan et al. | 345/853 |
| 2003/0009455 A1 | 1/2003 | Carlson et al. | 707/6 |
| 2003/0011638 A1* | 1/2003 | Chung | 345/808 |
| 2003/0011639 A1 | 1/2003 | Webb | 345/808 |
| 2003/0014490 A1 | 1/2003 | Bates et al. | 709/206 |
| 2003/0022700 A1 | 1/2003 | Wang | 455/566 |
| 2003/0025732 A1 | 2/2003 | Prichard | 345/765 |
| 2003/0035917 A1 | 2/2003 | Hyman | 428/67 |
| 2003/0038832 A1 | 2/2003 | Sobol | |
| 2003/0043200 A1 | 3/2003 | Faieta et al. | 345/804 |
| 2003/0043211 A1 | 3/2003 | Kremer et al. | |
| 2003/0046528 A1 | 3/2003 | Haitani et al. | 713/2 |
| 2003/0066025 A1 | 4/2003 | Garner et al. | 715/500 |
| 2003/0070143 A1 | 4/2003 | Maslov | 715/513 |
| 2003/0093490 A1 | 5/2003 | Yamamoto et al. | 709/213 |
| 2003/0097361 A1 | 5/2003 | Huang et al. | 707/10 |
| 2003/0098891 A1 | 5/2003 | Molander | 715/841 |
| 2003/0110191 A1 | 6/2003 | Handsaker et al. | 707/503 |
| 2003/0112278 A1 | 6/2003 | Driskell | 715/788 |
| 2003/0135825 A1 | 7/2003 | Gertner et al. | 715/513 |
| 2003/0156140 A1 | 8/2003 | Watanabe | 345/810 |
| 2003/0160821 A1 | 8/2003 | Yoon | 345/762 |
| 2003/0167310 A1 | 9/2003 | Moody et al. | 709/206 |
| 2003/0169284 A1 | 9/2003 | Dettinger et al. | 707/3 |
| 2003/0195937 A1 | 10/2003 | Kircher et al. | 709/207 |
| 2003/0206646 A1 | 11/2003 | Brackett | |
| 2003/0218611 A1 | 11/2003 | Ben-Tovim et al. | 345/440 |
| 2003/0226106 A1 | 12/2003 | McKellar et al. | 715/513 |
| 2003/0227487 A1 | 12/2003 | Hugh | 715/777 |
| 2003/0233419 A1 | 12/2003 | Beringer | 709/206 |
| 2004/0003351 A1 | 1/2004 | Sommerer et al. | 715/251 |
| 2004/0012633 A1 | 1/2004 | Helt | |
| 2004/0056894 A1 | 3/2004 | Zaika et al. | 345/762 |
| 2004/0090315 A1 | 5/2004 | Mackjust et al. | 340/426.13 |
| 2004/0100504 A1 | 5/2004 | Sommer | 345/810 |
| 2004/0100505 A1 | 5/2004 | Cazier | 345/811 |
| 2004/0107197 A1 | 6/2004 | Shen et al. | 707/9 |
| 2004/0109025 A1 | 6/2004 | Hullot et al. | 715/764 |
| 2004/0109033 A1 | 6/2004 | Vienneau et al. | 345/863 |
| 2004/0117451 A1 | 6/2004 | Chung | 709/207 |
| 2004/0119760 A1 | 6/2004 | Grossman et al. | 715/854 |
| 2004/0122789 A1 | 6/2004 | Ostertag et al. | |
| 2004/0128275 A1 | 7/2004 | Moehrle | 707/1 |
| 2004/0133854 A1 | 7/2004 | Black | 715/517 |
| 2004/0142720 A1 | 7/2004 | Smethers | 455/550.1 |
| 2004/0164983 A1 | 8/2004 | Khozai | 345/440 |
| 2004/0168153 A1 | 8/2004 | Marvin | 717/120 |
| 2004/0186775 A1 | 9/2004 | Margiloff et al. | 705/14 |
| 2004/0189694 A1 | 9/2004 | Kurtz et al. | |
| 2004/0192440 A1 | 9/2004 | Evans et al. | |
| 2004/0221234 A1 | 11/2004 | Imai | 715/256 |
| 2004/0230508 A1 | 11/2004 | Minnis et al. | 705/35 |
| 2004/0230906 A1 | 11/2004 | Pik et al. | 715/522 |
| 2004/0239700 A1 | 12/2004 | Bacshy | 715/781 |
| 2004/0243938 A1 | 12/2004 | Weise et al. | 715/205 |
| 2004/0261013 A1 | 12/2004 | Wynn et al. | 715/511 |
| 2004/0268231 A1 | 12/2004 | Tunning | 715/513 |
| 2004/0268270 A1 | 12/2004 | Hill et al. | 715/963 |
| 2005/0004989 A1 | 1/2005 | Satterfield et al. | 709/206 |
| 2005/0004990 A1 | 1/2005 | Durazo et al. | 709/206 |
| 2005/0005235 A1 | 1/2005 | Satterfield et al. | 715/519 |
| 2005/0005249 A1 | 1/2005 | Hill et al. | 715/963 |
| 2005/0010871 A1 | 1/2005 | Ruthfield et al. | 715/712 |
| 2005/0021504 A1 | 1/2005 | Atchison | 707/3 |
| 2005/0022116 A1 | 1/2005 | Bowman et al. | 715/513 |
| 2005/0039142 A1 | 2/2005 | Jalon et al. | 715/823 |
| 2005/0043015 A1 | 2/2005 | Muramatsu | 455/412.1 |
| 2005/0044500 A1* | 2/2005 | Orimoto et al. | 715/706 |
| 2005/0057584 A1 | 3/2005 | Gruen et al. | 345/752 |
| 2005/0086135 A1 | 4/2005 | Lu | 705/30 |
| 2005/0091576 A1 | 4/2005 | Relyea et al. | |
| 2005/0097465 A1 | 5/2005 | Giesen et al. | 715/700 |
| 2005/0114778 A1 | 5/2005 | Branson et al. | 715/711 |
| 2005/0117179 A1 | 6/2005 | Ito et al. | 358/1.15 |
| 2005/0138576 A1 | 6/2005 | Baumert et al. | 715/862 |
| 2005/0144241 A1 | 6/2005 | Stata et al. | |
| 2005/0172262 A1 | 8/2005 | Lalwani | 717/109 |
| 2005/0183008 A1 | 8/2005 | Crider et al. | 715/517 |
| 2005/0203975 A1 | 9/2005 | Jindal et al. | 707/204 |
| 2005/0216863 A1 | 9/2005 | Schumacher et al. | 715/827 |
| 2005/0223329 A1 | 10/2005 | Schwartz et al. | 715/711 |
| 2005/0256867 A1 | 11/2005 | Walther et al. | 707/5 |
| 2005/0278656 A1 | 12/2005 | Goldthwaite et al. | 715/810 |
| 2005/0289156 A1 | 12/2005 | Maryka et al. | 707/100 |
| 2005/0289159 A1 | 12/2005 | Hadley et al. | 707/100 |
| 2006/0015816 A1 | 1/2006 | Kuehner et al. | 715/744 |
| 2006/0020962 A1 | 1/2006 | Stark | 725/32 |
| 2006/0036580 A1 | 2/2006 | Stata | 707/3 |
| 2006/0036945 A1 | 2/2006 | Radtke et al. | 715/708 |
| 2006/0036950 A1 | 2/2006 | Himberger et al. | 715/732 |
| 2006/0036964 A1 | 2/2006 | Satterfield et al. | 715/777 |
| 2006/0036965 A1 | 2/2006 | Harris et al. | 715/777 |
| 2006/0041545 A1 | 2/2006 | Heidloff et al. | 707/4 |
| 2006/0047644 A1 | 3/2006 | Bocking et al. | |
| 2006/0069604 A1 | 3/2006 | Leukart et al. | 705/9 |
| 2006/0069686 A1 | 3/2006 | Beyda et al. | 707/10 |
| 2006/0080303 A1 | 4/2006 | Sargent et al. | 707/3 |
| 2006/0095865 A1 | 5/2006 | Rostom | 715/810 |
| 2006/0101051 A1 | 5/2006 | Carr et al. | 707/102 |
| 2006/0101350 A1 | 5/2006 | Scott | 715/779 |
| 2006/0111931 A1* | 5/2006 | Johnson et al. | 705/1 |
| 2006/0117249 A1 | 6/2006 | Hu et al. | 715/255 |
| 2006/0129937 A1 | 6/2006 | Shafron | 715/733 |
| 2006/0155689 A1 | 7/2006 | Blakeley et al. | 707/3 |
| 2006/0173824 A1 | 8/2006 | Bensky | 707/3 |
| 2006/0218500 A1 | 9/2006 | Sauve et al. | 715/767 |
| 2006/0242557 A1 | 10/2006 | Nortis, III | 715/234 |
| 2006/0242575 A1 | 10/2006 | Winser | 715/530 |
| 2006/0294452 A1 | 12/2006 | Matsumoto | 715/236 |
| 2007/0006206 A1 | 1/2007 | Dhanjal et al. | 717/168 |
| 2007/0050401 A1 | 3/2007 | Young et al. | 707/102 |
| 2007/0055936 A1 | 3/2007 | Dhanjal et al. | |
| 2007/0055943 A1 | 3/2007 | McCormack et al. | 715/746 |
| 2007/0061306 A1 | 3/2007 | Pell et al. | 707/3 |
| 2007/0061307 A1 | 3/2007 | Hartwell et al. | 707/3 |
| 2007/0061308 A1 | 3/2007 | Hartwell et al. | 707/3 |

| | | | |
|---|---|---|---|
| 2007/0106951 A1 | 5/2007 | McCormack et al. | 715/764 |
| 2007/0143671 A1 | 6/2007 | Paterson et al. | 715/209 |
| 2007/0185826 A1 | 8/2007 | Brice et al. | 707/1 |
| 2007/0240057 A1 | 10/2007 | Satterfield et al. | 715/705 |
| 2007/0260996 A1 | 11/2007 | Jakobson | 715/781 |
| 2007/0279417 A1 | 12/2007 | Garg et al. | 345/440 |
| 2007/0300168 A1 | 12/2007 | Bosma et al. | 715/820 |
| 2008/0034304 A1 | 2/2008 | Feuerbacher et al. | 715/764 |
| 2008/0040682 A1 | 2/2008 | Sorenson et al. | 715/777 |
| 2008/0052670 A1 | 2/2008 | Espinosa et al. | |
| 2008/0178110 A1 | 7/2008 | Hill et al. | 715/771 |
| 2009/0007003 A1 | 1/2009 | Dukhon et al. | 715/778 |
| 2009/0083656 A1 | 3/2009 | Dukhon et al. | 715/781 |
| 2009/0100009 A1 | 4/2009 | Karp | |
| 2009/0217192 A1 | 8/2009 | Dean et al. | 715/777 |
| 2009/0222763 A1 | 9/2009 | Dukhon et al. | 715/808 |
| 2010/0060645 A1 | 3/2010 | Garg et al. | 345/440 |
| 2010/0191818 A1 | 7/2010 | Satterfield et al. | 709/206 |
| 2010/0211889 A1 | 8/2010 | Durazo et al. | 715/752 |
| 2010/0223575 A1 | 9/2010 | Leukart et al. | 715/779 |

FOREIGN PATENT DOCUMENTS

| | | |
|---|---|---|
| EP | 1 077 405 A2 | 2/2001 |
| EP | 1 672 518 | 6/2001 |
| EP | 1 542 133 A2 | 6/2005 |
| EP | 1 835 434 A1 | 9/2007 |
| KR | 10-2005-0023805 A | 3/2005 |
| KR | 10-2005-0036702 A | 4/2005 |
| WO | WO 99/04353 | 1/1999 |
| WO | WO 99/27495 | 6/1999 |
| WO | WO 02/091162 A3 | 11/2002 |
| WO | WO03/098500 | 11/2003 |
| WO | WO 2007/033159 A1 | 3/2007 |
| WO | WO 2007/027737 A1 | 8/2007 |

OTHER PUBLICATIONS

Charles Rich, Candace L. Sidner, "Segmented Interaction History in a Collaborative Interface Agent," 1997 ACM, pp. 23-30.
Andrew Dwelly, "Functions and Dynamic User Interfaces," 1989 ACM, pp. 371-381.
Alias I. Wavefront, "The Hotbox: Efficient Access to a Large Number of Menu-items," ACM 1999, pp. 231-237.
Charles Rich, Candace L. Sidner, "Adding a Collaborative Agent to Graphical User Interfaces," 1996 ACM, pp. 21-30.
U.S. Official Action mailed Dec. 23, 2003 in U.S. Appl. No. 09/896,384.
U.S. Official Action mailed Aug. 24, 2004 in U.S. Appl. No. 09/896,384.
U.S. Appl. No. 10/982,073, filed Nov. 5, 2004, entitled "Gallery User Interface Controls".
U.S. Appl. No. 10/836,154, filed Apr. 30, 2004, entitled "Combined Content Selection and Display User Interface".
U.S. Appl. No. 10/848,774, filed May 19, 2004, entitled "Automatic Grouping of Electronic Mail".
Boyce, "Microsoft Outlook Inside Out," 2001, pp. 67, 68, 109, 110, 230, 231, 310, 316-318, 798.
Halvorson and Young, "Microsoft Office XP Inside Out," 2001, pp. 1005-1009, 1015, 1023-1028, 1036-1039, 1093.
Riggsby, McCoy, Haberman and Falciani, "Mastering Lotus Notes and Domino 6," 2003, pp. 135-139.
U.S. Appl. No. 10/851,442, filed May 21, 2004, entitled "Conversation Grouping of Electronic Mail Records".
Riggsby, McCoy, Haberman and Falciani, "Mastering Lotus Notes and Domino 6," 2003, pp. 135-138, 607-612.
U.S. Appl. No. 10/851,506, filed May 21, 2004, entitled "Adaptive Multi-Line View User Interface".
Examination Report, Jul. 25, 2005.
Search Report, Danish Patent and Trademark Office, Sep. 18, 2006.
Written Opinion, Danish Patent and Trademark Office, Sep. 18, 2006.
Search Report, Danish Patent and Trademark Office, Sep. 19, 2006.
U.S. Appl. No. 10/955,940, filed Sep. 30, 2004, entitled "User Interface for Displaying Selectable Software Functionality Controls that are Contextually Relevant to a Selected Object".
U.S. Appl. No. 10/955,967, filed Sep. 30, 2004, entitled "Command User Interface for Displaying Selectable Software Functionality Controls".
U.S. Appl. No. 10/955,942, filed Sep. 30, 2004, entitled "User Interface for Displaying a Gallery of Formatting Options Applicable to a Selected Object".
U.S. Appl. No. 10/955,928, filed Sep. 30, 2004, entitled "User Interface for Providing Task Management and Calendar Information".
U.S. Appl. No. 10/955,967, filed Sep. 30, 2004, entitled "Command User Interface for Displaying Selectable Software Functionality Controls".
U.S. Official Action mailed Apr. 27, 2006 in U.S. Appl. No. 10/800,056.
Amendment to Office Action of Apr. 27, 2006, dated Jul. 27, 2006 in U.S. Appl. No. 10/800,056.
U.S. Official Action mailed Oct. 19, 2006 in U.S. Appl. No. 10/800,056.
Amendment to Office Action of Oct. 19, 2006, dated Jan. 19, 2007 in U.S. Appl. No. 10/800,056.
U.S. Appl. No. 10/800,056, filed Mar. 12, 2004, entitled "Method and System for Data Binding in a Block Structured User Interface Scripting Language".
Khare and Rifkin, "The Origin of (Document) Species," University of California, 1998 (9 pages).
"Separate Structure and Presentation," http://www.webreference.com/html/tutorial5/1.html, Aug. 20, 1998 (4 pages).
"The Style Attribute and CSS Declarations," http://www.webreference.com/html/tutorial5/2, Aug. 20, 1998 (4 pages).
"What's Hot in Internet Services?," hup://www.webreference.com/html/tutorial5/3, Aug. 20, 1998 (3 pages).
"The Style Element & CSS Selectors," http://www.webreference.com/html/tutorial5/4.html, Aug. 20, 1998 (e pages).
http://www/webreference.com/html/tutorial5/5.html, Aug. 20, 1998 (3 pages.
"ID & Class Selectors, Pseudoclasses," http://www.webreference.com/html/tutorial5/6.html, Aug. 20, 1998 (3 pages).
http://www.webreference.com/html/tutorial5/7.html, Aug. 20, 1998 (3 pages).
http://www.webreference.com/html/tutorial5/8.html, Aug. 20, 1998 (2 pages).
"External Style Sheets," http://www.webreference.com/html/tutorial5/10.html, Aug. 20, 1998 (3 pages).
Raman, "Cascaded Speech Style Sheets," 1997 (9 pages).
"Primary Windows," http://www-03.ibm.com/servers/eserver/iseries/navigator/guidelines/primary.html, (23 pages).
"User Interface Standards" http://msdn2.microsoftt.com/en-us/library/aa217660(office.11.d=printer).aspx, Sep. 2001 (5 pages).
"WebSphere Studio Overview," http://researchweb.watson.ibm.com/journal/sj/432/budinsky.html, May 6, 2004 (25 pages).
U.S. Official Action mailed Feb. 14, 2007 in U.S. Appl. No. 10/800,056.
Philippine Official Action dated Jul. 31, 2008 cited in Philippine Application No. 12005000495.
European Communication dated Jun. 23, 2008 cited in European Application No. 04102463.9-2211/1517239.
Philippines Examiner's Action dated Aug. 19, 2008 cited in Application No. 1-2005-000405.
Chinese Second Office Action dated Oct. 10, 2008 cited in Application No. 200510092141.1.
Chinese Second Office Action dated Oct. 17, 2008 cited in Application No. 200510092139.4.
U.S. Final Office Action dated Oct. 28, 2008 cited in U.S. Appl. No. 11/151,686.
U.S. Office Action dated Nov. 25, 2008 cited in U.S. Appl. No. 11/154,278.
U.S. Office Action dated Dec. 11, 2008 cited in U.S. Appl. No. 10/982,073.
Microsoft Office 2003, Microsoft Office Professional Edition 2003, Microsoft Corporation, 10 pages.

Screendumps—Microsoft Office, Microsoft Office Professional Edition 2003, Microsoft Corporation, 10 pages.

Screendumps—Microsoft Office Outlook, Microsoft Office Outlook Professional Edition 2003, Microsoft Corporation, 2 pages.

Chinese Second Office Action dated Nov. 21, 2008 cited in Appln No. 200510089514.X.

U.S. Official Action dated Dec. 23, 2008 in U.S. Appl. No. 10/955,942.

U.S. Official Action dated Dec. 24, 2008 in U.S. Appl. No. 10/955,967.

U.S. Official Action dated Jan. 6, 2009 in U.S. Appl. No. 10/955,941.

Chilean Office Action dated Nov. 27, 2008 cited in Appln No. 1768-2005.

Chilean Office Action dated Nov. 27, 2008 cited in Appln No. 1769-2005.

Copending U.S. Appl. No. 12/372,386, filed Feb. 17, 2009 entitled "Command User Interface for Displaying Multiple Sections of Software Functionality Controls".

Chinese First Office Action dated Apr. 18, 2008 cited in Chinese Application No. 200510092142.6.

Chinese First Office Action dated May 23, 2008 cited in Chinese Application No. 200510089514.X.

Chilean Office Action dated Sep. 23, 2008 cited in Chilean Application No. 1770-05.

U.S. Office Action dated Jun. 19, 2008 cited in U.S. Appl. No. 10/851,506.

U.S. Office Action dated Jun. 20, 2008 cited in U.S. Appl. No. 10/955,928.

U.S. Office Action dated Jul. 17, 2008 cited in U.S. Appl. No. 10/955,940.

Microsoft Office Word 2003 Part of Microsoft Office Professional Edition 2003, screen shot 1.

Chinese Office Action dated Apr. 3, 2009 cited in Appln No. 200510089514.X.

U.S. Office Action dated Mar. 18, 2009 in U.S. Appl. No. 11/401,470.

U.S. Office Action dated Apr. 7, 2009 in U.S. Appl. No. 10/955,940.

Berliner E.M. et al., "Microsoft Office 2003", Feb. 24, 2004, p. 39-40, 120-124, 175-177, 233-234 [D1].

Berliner E.M. et al., "Microsoft Office 2003", Feb. 24, 2004, p. 173-178 [D2].

Israeli Office Action dated Sep. 6, 2009 cited in Appln No. 169716.

Israeli Office Action dated Sep. 7, 2009 cited in Appln No. 169718.

Russian Office Action dated Sep. 10, 2009 cited in Appln No. 2005125836/09(029010).

Russian Office Action dated Sep. 10, 2009 cited in Appln No. 2005125839/09(029013).

European Communication dated Sep. 28, 2009 cited in Appln No. 09006972.5-2211.

Chinese Office Action dated Oct. 16, 2009 cited in Appln No. 200510092142.6.

U.S. Official Action dated Nov. 13, 2009 in U.S. Appl. No. 11/154,278.

U.S. Official Action dated Nov. 24, 2009 in U.S. Appl. No. 11/445,393.

Chilean Second Office Action dated Mar. 4, 2009 cited in Appln No. 2512-2005.

U.S. Office Action dated Apr. 28, 2009 in U.S. Appl. No. 12/028,797.

Nielsen, Jacob. "Tabs, Used Right," Alertbox, Sep. 17, 2007, http://www.useit.com/alertbox/tabs.html, 6 pages.

"Managing the Code Editor and View" Microsoft Corporation, http://msdn.microsoft.com/en-us/library/z01zks9a(VS.71).aspx, 2008.

Agarwal, Vikash K., "Creating a Visually Arresting User-Interface: A₃D Tab Control Example," Jan. 4, 2008, http://microsoft.apress.com/asptodayarchive/71723/creating-a-visually-arresting-user-interface-a-3d-tab-control-exmaple, 12 pages.

"Omni Web Help," Omni Group, 2004, http://www.omnigroup.com/documentation/omniweb/browser/tabs.html, 2 pages.

Hepfner, Troy, "New SOCET CXP Interface Improves Usability," Sep. 2008, http://www.socetset.com/gxpmosaic/?p=95, 4 pages.

Chinese Office Action dated Apr. 3, 2009 cited in Appln No. 200510089514.X.

"TeeChart for .NET Charting Control," TeeChart for NET Steema Software. http://Iwww.teechart.net.

"Convert to Word 2007," http://www.regencytraining.com/word-2007-conversion.html, Regency Training and Consulting, 2 pages (Date Printed Apr. 21, 2008).

"Customer Story: SourceXtreme," SourceXtreme—Trolltech, http://trolltech.com/customers/casestories/stories/sourcextreme/?searchterm=sourcextreme, 2 pages (Date Printed Apr. 22, 2008).

"Inter-Widget Communication," http://web.mit.edu/6.115/www/miscfiles/amulet/amulet-help/IWC.htm, 6 pages (Feb. 13, 2007).

"The Technology in Document and Check Security," http://www.securedoc.in/thetechnology.htm, 7 pages (Date Printed Apr. 21, 2008).

Ando, R. et al., "Visualization-enabled multi-document summarization by Iterative Residual Rescaling," Natural Language Engineering, vol. 11, No. 1, pp. 67-86 (Mar. 2005) (2 page Abstract).

Bos, B, "Re: A proposal for addition to HTML 3.0: Frames," http://www.nyct.net/~aray/htmlwg/95q3/1141.html, 5 pages (Sep. 21, 1995).

de Candussio, N., "Common GUI Features Report," Herschel CSDT Meeeting, pp. 1-21 (Sep. 2007).

Krill, P., "Microsoft's Ribbon Interface Draws Frowns, Smiles," InfoWorld, http://www.infoworld.com/article/08/03/04/10NF-microsoft-fluentui__1.html, 3 pages (Mar. 4, 2008).

Rice, F, "Customizing the 2007 Office System Document Inspector," http://msdn2.microsoft.com/en-us/library/aa338203(d=printer).aspx, 10 pages (May 2006).

Boyce, "Microsoft Outlook Inside Out," 2001, pp. 133, 134, 721-728.

Halvorson et al., "Microsoft Office XP Inside Out," 2001, pp. 4, 5, 10, 11, 70-74, 281-288, 1010-1014, 1173-1175.

Pogue, David. "Windows XP Home Edition: The Missing Manual," O'Reilly, 1st Edition, May 1, 2002, pp. 37, 38, 41.

Screendumps—Microsoft Office, Microsoft Corporation, Microsoft Office Professional Edition 2003, 13 pages.

PCT Search Report dated Feb. 6, 2007 cited in International Application No. PCT/US2006/035467.

International Search Report dated Nov. 27, 2007 in PCT/US2007/012573, 9 pages.

Supplementary European Search Report dated May 28, 2009 cited in EP Application No. 07795391.7-1225.

PCT Search Report dated Feb. 6, 2007 cited in International Application No. PCT/US2006/035467.

International Search Report dated Nov. 2007 in PCT/US2007/012573, 9 pages.

European Communication dated Jun. 9, 2009 cited in EP Application No. 07795391.7-1225.

Mexican Office Action dated Jun. 19, 2009 cited in Appln. No. PA/a/2005/007073.

Chinese Office Action dated Jul. 3, 2009 cited in Appln. No. 200680018095.3.

Russian Office Action dated Jul. 21, 2009 cited in Appln. No. 2005125837/09(029011).

Russian Office Action dated Jul. 30, 2009 cited in Appln. No. 2005125831/09(029005).

European Search Report dated Sep. 7, 2009 cited in EP Application No. 09006972.5-2211.

European Communication dated Sep. 14, 2009 cited in Appln. No. 07795391.7-1225.

U.S. Official Action dated Sep. 6, 2007 in U.S. Appl. No. 11/136,800.

U.S. Official Action dated May 30, 2008 cited in U.S. Appl. No. 11/430,562.

U.S. Official Action dated Jun. 27, 2008 cited in U.S. Appl. No. 11/430,416.

U.S. Official Action dated Jul. 9, 2008 cited in U.S. Appl. No. 11/136,800.

U.S. Official Action dated Aug. 4, 2009 in U.S. Appl. No. 10/955,967.

U.S. Official Action dated Aug. 4, 2009 in U.S. Appl. No. 10/955,942.

U.S. Official Action dated Aug. 18, 2009 in U.S. Appl. No. 11/782,059.

U.S. Official Action dated Sep. 23, 2009 in U.S. Appl. No. 11/401,470.

International Search Report dated Oct. 17, 2007 cited in International Application No. PCT/US2006/012724.

Billo, E. Joseph. "Creating Charts: an Introduction," Excel for Chemists: . A Comprehensive Guide, http://www.ahut.edu.cn/yxsz/ahk/Teaching/Excel%for%20Chemists/ChQ2.pdf, 9 pages.

Marsh, Bruce, Integrating Spreadsheet Templates and Data Analysis Into Fluid Power Instruction, Journal of Industrial Technology, vol. 16, No. 4, Aug. 2000-Oct. 2000. http://www.nait.org/jit/Articles/marsh071200.pdf, 7 pages.

Oracle Discoverer Desktop User's Guide; 10g (9.0.4) for Windows; Part No. B10272-01; published 2003; http://download-uk.oracle.com/docs/cd/B12166_01/bi/B10272_01/3graph.htm; pp. 1-18.

Lisa K. Averett; Joshua R. Knisley; Mark A. Marvin; Haiti: Projecting Tactical Network and Systems Management; 1995 IEEE pp. 906-910.

Mexican Office Action dated Feb. 5, 2009 cited in Appln No. PA/a/2005/008349.

Mexican Office Action dated Mar. 3, 2009 cited in Appln No. PA/a/2005/008351 English language only.

Chinese Third Office Action dated Jun. 19, 2009 cited in Appln No. 200510092139.4.

Russian Office Action dated Jun. 24, 2009 cited in Appln No. 2005120363/28(023023).

U.S. Official Action dated Feb. 22, 2008 in U.S. Appl. No. 11/445,393.

U.S. Official Action dated Oct. 8, 2008 cited in U.S. Appl. No. 11/445,393.

U.S. Official Action dated Jun. 1, 2009, U.S. Appl. No. 11/445,393.

U.S. Official Action dated Jun. 8, 2009 in U.S. Appl. No. 10/982,073.

U.S. Official Action dated Jun. 10, 2009 in U.S. Appl. No. 11/154,278.

U.S. Official Action dated Jun. 24, 2009 in U.S. Appl. No. 10/607,020.

PCT Search Report and Written Opinion dated Dec. 29, 2009 cited in International Application No. PCT/US2009/046344.

U.S. Final Office Action dated Jan. 6, 2010 cited in U.S. Appl. No. 10/607,020.

U.S. Office Action dated Jan. 25, 2010 cited in U.S. Appl. No. 10/982,073.

U.S. Appl. No. 12/574,256, filed Oct. 6, 2009 entitled "Modifying a Chart".

Perronne et al. "Building Java Enterprise Systems with J2EE", Publisher: Sams, Pub Date: Jun. 7, 2000 (pp. 1-8).

Israeli Office Action dated Oct. 12, 2009 cited in Appln No. 170668.

Russian Office Action dated Oct. 26, 2009 cited in Appln No. 2005120363/09(023023).

U.S. Official Action dated Dec. 9, 2009 in U.S. Appl. No. 12/028,797.

U.S. Official Action dated Dec. 10, 2009 in U.S. Appl. No. 10/955,940.

U.S. Appl. No. 11/154,278, filed Jun. 16, 2005 entitled "Cross Version and Cross Product User Interface Compatibility".

U.S. Appl. No. 11/401,470, filed Apr. 10, 2006 entitled "Command User Interface for Displaying Selectable Functionality Controls in a Database Application".

U.S. Appl. No. 10/607,020, filed Jun. 26, 2003 entitled "Side-by-Side Shared Calendars".

U.S. Appl. No. 10/741,407, filed Dec. 19, 2003 entitled "Methods, Systems, and Computer-Readable Mediums for Providing Persisting and Continuously Updating Search Folders".

U.S. Appl. No. 11/782,059, filed Jul. 24, 2007 entitled "Methods, Systems, and Computer-Readable Mediums for Providing Persisting and Continuously Updating Search Folders".

U.S. Appl. No. 10/955,941, filed Sep. 30, 2004 entitled "An Improved User Interface for Displaying Selectable Software Functionality Controls that are Relevant to a Selected Object".

Gordon Padwick, Using Microsoft Outlook 2000, Que, Sp. Ed., May 1999.

Becker et al., "Virtual Folders: Database Support for Electronic Messages Classification," Pontificia Universidade Catolica do Rio Grande do Sul, Porto Alegre, Brazil, pp. 163-170.

Goldberg et al., "Using Collaborative Filtering to Weave an Information Tapestry," Communication of the ACM, vol. 35, No. 12, pp. 61-70, Dec. 1992.

Liu et al., "Continual Queries for Internet Scale Event-Driven Information Delivery," IEEE Transactions on Knowledge and Data Engineering, vol. 11, Issue 1, pp. 610-628, 1999.

Chen et al., "NiagaraCQ: A Scalable Continuous Query System for Internet Databases," Int. Conf. On Management of Data, Proc. Of the 2000 ACM SIGMOD Int. Conf. On Management of Data, pp. 379-390, 2000.

Marshall School of Business: "Workshop IV—Calendar," http://www.marshall.usc.edu/computing/PDF_Files/Outlook/Workshop4, PDF, Apr. 10, 2000, pp. 1-4.

M. Williams, "Programming Windows NT4: Unleashed," Sams Publishing, Indianapolis, 1996, pp. index & 167-185.

"Microsoft Outlook 2000: Introduction to Calendar," Version 2002.03.25, http://www.uakron.edu/its/learning/training/docs/Calendar032502.pdf, Mar. 25, 2002, pp. 1-52.

Screen Dumps of Microsoft Outlook (1999, pp. 1-3).

"To-do List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.

"Rainy's Rainlendar" [online], Aug. 12, 2004, http://web.archive.org/web/20040811043048/www.ipi.fi/~rainy/Rainlendard/Manual.html and http://web.archive.org/web/20040812092939/http://www.ipi.fi/~rainy/index.php?pn=probjects&project=rainlendar>.

Microsoft Windows XP Professional, Version 2002, Service pack 2, 3 pgs.

Camarda, Using Microsoft Word 97, copyright 1997, QUE Corporation, pp. 412, 968.

Australian Search Report dated Jan. 16, 2007 cited in Singapore Application No. 200504474-8.

PCT Search Report dated Feb. 26, 2007 cited in International Application No. PCT/US2006/034993.

European Communicated dated Oct. 20, 2005 cited in EP Application No. 04102463.0-2211 PCT/.

Australian Written Opinion/Search Report cited in Singapore Application No. 200505257-6 mailed Feb. 12, 2007.

U.S. Office Action dated Apr. 12, 2007 cited in U.S. Appl. No. 10/851,506.

U.S. Office Action dated Jun. 4, 2007 cited in U.S. Appl. No. 10/955,940.

U.S. Office Action dated Jul. 26, 2006 cited in U.S. Appl. No. 10/741,407.

U.S. Final Office Action dated Jan. 23, 2007 cited in U.S. Appl. No. 10/741,407.

U.S. Notice of Allowance dated Apr. 10, 2007 cited in U.S. Appl. No. 10/741,407.

U.S. Office Action dated Jan. 4, 2007 cited in U.S. Appl. No. 10/607,020.

U.S. Office Action dated Jun. 14, 2007 cited in U.S. Appl. No. 10/836,154.

U.S. Office Action dated Jun. 21, 2007 cited in U.S. Appl. No. 10/955,928.

U.S. Notice of Allowance dated Jul. 5, 2007 cited in U.S. Appl. No. 10/607,020.

U.S. Office Action dated Jul. 11, 2007 cited in U.S. Appl. No. 10/955,941.

U.S. Office Action dated Jul. 11, 2007 cited in U.S. Appl. No. 10/955,967.

U.S. Office Action dated Jul. 11, 2007 cited in U.S. Appl. No. 10/955,942.

U.S. Office Action dated Oct. 9, 2007 cited in U.S. Appl. No. 10/982,073.

U.S. Final Office Action dated Dec. 21, 2007 cited in U.S. Appl. No. 10/851,506.

U.S. Final Office Action dated Dec. 28, 2007 cited in U.S. Appl. No. 10/800,056.

U.S. Final Office Action dated Jan. 8, 2008 cited in U.S. Appl. No. 10/955,928.

U.S. Office Action dated Jan. 28, 2008 cited in U.S. Appl. No. 10/836,154.

U.S. Appl. No. 12/028,797, filed Feb. 9, 2008 entitled "Side-by-Side Shared Calendars".

U.S. Office Action dated Feb. 20, 2008 cited in U.S. Appl. No. 10/848,774.
U.S. Office Action dated Feb. 21, 2008 cited in U.S. Appl. No. 10/851,442.
Marshall School of Business, Workshop 1—Introduction to Outlook & E-mail, Apr. 6, 2000, pp. 1-11.
Jane Dorothy Calabria Burke, Ten Minute Guide to Lotus Notes 4.6, Publication date: Dec. 23, 1997, 2 pgs.
Bill Dyszel, Microsoft Outlook 2000 for Windows for Dummies, Copyright 1999, pp. 82-86, 102-103, 141,143.
Gina Danielle Venolia et al., Understanding Sequence and Reply Relationships within Email Conversations: A Mixed-Model Visualization, CHI 2003, Apr. 5-10, 2003, Volume No. 5, Issue No. 1, pp. 361-368.
U.S. Final Office Action dated Apr. 15, 2008 cited in U.S. Appl. No. 10/955,942.
Screendumps Microsoft Corporation, Microsoft Office Professional Edition 2003, 5 pgs.
U.S. Final Office Action dated Apr. 16, 2008 cited in U.S. Appl. No. 10/955,967.
Screendumps Microsoft Corporation, Microsoft Office Professional Edition 2003, 4 pgs.
U.S. Final Office Action dated May 28, 2008 cited in U.S. Appl. No. 10/982,073.
Chinese Official Action dated Mar. 21, 2008 cited in Chinese Application No. 200510092146.4.
Chinese Official Action dated Mar. 21, 2008 cited in Chinese Application No. 200510092139.4.
Philippine Official Action dated Apr. 21, 2008 cited in Philippine Application No. 1-2005-000405.
Philippine Official Action dated Apr. 21, 2008 cited in Philippine Application No. 1-2005-000406.
U.S. Final Office Action dated Apr. 29, 2008 cited in U.S. Appl. No. 10/955,941.
Habraken, Microsoft Office XP 8 in 1, published Jun. 5, 2001, http://proquest.safaribooksonline.com/0789725096/, 12 pgs.
Word 2002, Chapter 14; Paradigm Publishing Inc., copyright 2002; http://www.emcp.com/tech_tutorials/sig_irc/Signature_Word_Chapter_14.ppt, 21 pgs.
Chilean Office Action dated Mar. 28, 2008 cited in Application No. 1770-05, no English Translation.
Chinese First Office Action dated Apr. 11, 2008 cited in Application No. 200510092141.1.
Philippines Examiner's Action dated Sep. 12, 2008 cited in Application No. 1200500406.
Microsoft Office 11 Beta Layperson's Specification, Copyright 2002, Microsoft Corporation, 28 pgs.
FrontPage 11 Beta Layperson's Specification, Copyright 2002, Microsoft Corporation, 12 pgs.
Office 11 Beta Letter, Copyright 2002, Microsoft Corporation, 6 pgs.
Microsoft XDocs Beta Layperson Specification, Copyright 2002, Microsoft Corporation, 3 pgs.
Microsoft Publisher 11 Beta Layperson's Specification, Copyright 2002, Microsoft Corporation, 13 pgs.
U.S. Appl. No. 12/725,605, filed Mar. 17, 2010 entitled "Improved User Interface for Displaying Selectable Software Functionality Controls that are Relevant to a Selected Object".
U.S. Appl. No. 12/753,923, filed Apr. 5, 2010 entitled "Automatic Grouping of Electronic Mail".
Padwick, Gordon "Using Microsoft Outlook 2000," 1999 Que Publishing, pp. 530-533.
Slovak, Ken. "Absolute Beginner's Guide to Microsoft Office Outlook 2003." 2003, Que Publishing, pp. 237-241.
Microsoft Press, Microsoft Computer Dictionary, Microsoft Press, Fifth Edition, pp. 374, 382.
Riggsby, McCoy, Haberman and Falciani, "Mastering Lotus Notes and Domino 6." 2003, pp. 18, 22, 33-35, 47, 122, 123, 215-241, 378.
"About Google Desktop Search", http://www.desktop.google.com/about.html, Oct. 15, 2004, 8 pages.
Find any file or email on your PC as fast as you can type!, http://www.xl.com, 2003, 1 page.
"Lookout", http://www.lookoutsoft.com, Apr. 22, 2005, 20 pages.
"Yahoo to test desktop search", http://news.com.com/yahoo+to+test+desktop+searcach/2100-1032_3-5486381.html, Dec. 9, 2004, 6 pages.
"Microsoft reinvents its own wheel", http://www.theinquirer.net/default.aspx?article=20214, Dec. 14, 2004, 5 pages.
"Microsoft Desktop Search (beta)", http://www.pcmag.com/article2/0.1895.1771841.00.asp, Mar. 2, 2005.
"Windows Desktop Search". Http://kunal.kundale.net/reviews/wds.html, Jul. 10, 2005, 7 pages.
"Microsoft Enters Desktop Search Fray", http://wwvv.internetnews.com/ent-news/article.php/3447331, Dec. 13, 2004, 5 pages.
Screendumps—Microsoft Office (Microsoft Corporation, Microsoft Office Professional Edition 2003; 16 pages).
NZ Application No. 541301, Examination Report dated Jul. 25, 2005.
NZ Application No. 541299, Examination Report dated Jul. 25, 2005.
Russian Office Action dated Oct. 30, 2009 cited in Appln No. 2005125837/09(029011).
Chilean Second Office Action dated Nov. 4, 2009 cited in Appln No. 1770-2005.
Chinese Office Action dated Nov. 27, 2009 cited in Appln No. 200680033212.3.
PCT Search Report and Written Opinion dated Nov. 30, 2009 cited in International Application No. PCT/US2009/046341.
Chilean Second Office Action dated Dec. 4, 2009 cited in Appln No. 1768-2005.
Russian Office Action dated Dec. 28, 2009 cited in Appln No. 2005125836/09(029010).
Chinese Office Action dated Jan. 22, 2010 cited in Appln No. 200680032564.7.
Chilean Second Office Action dated Jan. 29, 2010 cited in Appln No. 1769-2005.
Chinese Third Office Action dated Feb. 12, 2010 cited in Appln No. 200510092142.6.
Philippines Examiner's Action dated Mar. 11, 2010 cited in Appln No. 1-2005-000405.
Chinese Office Action dated Mar. 11, 2010 cited in Appln No. 200780020312.7.
Australian Office Action dated Mar. 25, 2010 cited in Appln No. 2005203411.
Australian Office Action dated Mar. 25, 2010 cited in Appln No. 2005203412.
Australian Office Action dated Mar. 26, 2010 cited in Appln No. 2005203409.
Australian Office Action dated Apr. 8, 2010 cited in Appln No. 2005203410.
U.S. Official Acton dated Nov. 13, 2008 in U.S. Appl. No. 11/430,562.
U.S. Official Action dated Jan. 9, 2009 in U.S. Appl. No. 11/430,561.
U.S. Official Acton dated Jun. 19, 2009 in U.S. Appl. No. 11/430,562.
U.S. Official Action dated Aug. 17, 2009 in U.S. Appl. No. 11/430,561.
U.S. Official Acton dated Jan. 7, 2010 in U.S. Appl. No. 11/430,562.
U.S. Official Action dated Jan. 20, 2010 in U.S. Appl. No. 10/955,967.
U.S. Official Action dated Feb. 18, 2010 in U.S. Appl. No. 11/782,059.
U.S. Official Action dated Feb. 19, 2010 in U.S. Appl. No. 10/955,942.
U.S. Official Action dated Feb. 22, 2010 in U.S. Appl. No. 11/401,470.
U.S. Official Action dated Apr. 15, 2010 in U.S. Appl. No. 11/823,999.
U.S. Appl. No. 12/769,787, filed Apr. 29, 2010 entitled "Conversation Grouping of Electronic Mail Records".
U.S. Appl. No. 12/777,287, filed May 11, 2010 entitled "User Interface for Providing Task Management and Calendar Information".
U.S. Appl. No. 11/217,071, filed Aug. 30, 2005 entitled "Markup Based Extensibility for User Interfaces".
Clifton, The Application Automation layer—Using XML to Dynamically Generale GUI Elements—forms and controls, The Code Project, Jun. 2003, pp. 1-37.
Australian Office Action dated May 28, 2010 cited in Appln No. 2005202717.

U.S. Official Action dated Mar. 30, 2010 in U.S. Appl. No. 11/217,071.
U.S. Official Action dated May 5, 2010 in U.S. Appl. No. 10/851,506.
U.S. Official Action dated May 25, 2010 in U.S. Appl. No. 10/607,020.
U.S. Official Action dated Jun. 3, 2010 in U.S. Appl. No. 12/028,797.
U.S. Official Action dated Jun. 22, 2010 in U.S. Appl. No. 11/430,562.
U.S. Official Action dated Jun. 23, 2010 in U.S. Appl. No. 10/955,940.
U.S. Official Action dated Jul. 1, 2010 in U.S. Appl. No. 11/782,059.
U.S. Official Action dated Jul. 6, 2010 in U.S. Appl. No. 10/955,967.
ScreenShot of MS_Office_2003; (Microsoft Corporation, Microsoft Office Professional Edition 2003; 6 pages).
U.S. Office Action dated Jul. 13, 2007 cited in U.S. Appl. No. 10/800,056.
U.S. Final Office Action dated Dec. 4, 2007 cited in U.S. Appl. No. 10/955,940.
PCT Written Opinion and Search Report dated Jan. 9, 2007 cited in International Application No. PCT/US2006/033809.
European Office Action mailed Mar. 9, 2009, cited in Appln No. 06790087.8.
U.S. Official Action dated Sep. 15, 2009 in U.S. Appl. No. 11/217,071.
Mexican Office Action dated Aug. 12, 2010 cited in Appln No. 2005/008354.
U.S. Official Action dated Aug. 2, 2010 in U.S. Appl. No. 10/955,942.
U.S. Official Action dated Aug. 6, 2010 in U.S. Appl. No. 11/401,470.
U.S. Official Action dated Sep. 21, 2010 in U.S. Appl. No. 11/217,071.
U.S. Official Action dated Sep. 27, 2010 in U.S. Appl. No. 10/836,154.
PCT Written Opinion and Search Report dated Sep. 2, 2010 cited in International Application No. PCT/US2010/021888.
Malaysian Substantive Examination Adverse Report dated Sep. 30, 2010 cited in Appln No. PI 20052959.
Australian Office Action dated Oct. 21, 2010 cited in Appln No. 2006284908.
Chinese Second Office Action dated Oct. 29, 2010 cited in Appln No. 200680030421.2.

* cited by examiner

FLOATING COMMAND OBJECT

CROSS-REFERENCE TO RELATED APPLICATIONS

The present application claims priority to U.S. Provisional Application No. 60/601,815, Applicant Matter No. 309417.1, filed Aug. 16, 2004, entitled "Improved User Interfaces for Computer Software Applications."

BACKGROUND

With the advent of the computer age, computer and software users have grown accustomed to user-friendly software applications that help them write, calculate, organize, prepare presentations, send and receive electronic mail, make music, and the like. For example, modem electronic word processing applications allow users to prepare a variety of useful documents. Modern spreadsheet applications allow users to enter, manipulate, and organize data. Modem electronic slide presentation applications allow users to create a variety of slide presentations containing text, pictures, data or other useful objects. Modern database applications allow users to store, organize and exchange large amounts of data.

In a typical setting, users enter and edit text or data in documents or files generated with such applications, for example, memoranda, spreadsheets, slide presentations, database files, and the like. During text or data entry, or during subsequent editing of text or data, users often apply various properties, such as formatting properties, to text or data. For example, in a given paragraph in a school term paper, a student may desire to boldface a word, italicize a word or number, change the font properties on a text or data entry, and the like. Indeed, the vast majority of tool selection during text/data entry and editing comes from simple text formatting commands like boldface, italics and font.

The traditional location of buttons or controls for selecting these types of commands is in a toolbar located along an edge of a user interface being used to enter and edit the text or data. Selecting commands from such statically located toolbars is inefficient because the user must first select a text, data or other object in the document and then move an electronic pointer, for example, a mouse pointer, to the desired command button or control in the toolbar to select the desired command. The user must then move the pointer back to the editing position in the document for making additional edits, if desired.

Pop-up contextual menus are available for deploying near a text/data entry or editing point. Such contextual menus typically require a secondary selection, such as a right mouse click, for deploying the menu, and such contextual menus typically contain many different functionality controls or buttons in addition to the simple formatting functions most commonly and frequently used on selected objects. Also, when a user selects a given command from such contextual menus, the deployed menu typically closes after the selection. If the user desires additional functionality from the contextual menu, the contextual menu must be re-deployed by the user.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments of the present invention are directed to a floating command object (hereafter "floating object") (also known as a "floatie") that contains a small set of functions that are relevant to a selected object. The floating object dynamically deploys in a document in close proximity to an entry/editing point upon the selection of a text, data or other object. According to embodiments of the present invention, the floating object deploys in a consistent location relative to a selected object each time it is deployed. Alternatively, if available display space does not allow the floating object to deploy in a consistent location for a given deployment, or if deployment in a given location will cover a displayed object that should remain visible, the floating object may be displayed in a different location.

The floating object typically contains only a set of commands that are relevant to the currently selected object. The commands contained in the floating object are those that modify the selected object without requiring the opening of additional functionality user interfaces. According to an embodiment, the commands contained in the floating object may be customized by a user.

The floating object of the present invention may be deployed from other user interfaces such as contextual menus. However, unlike contextual menus, selection of a given command from the floating object does not close the floating object. The floating object remains deployed to allow multiple functionality selections, for example, boldface selection followed by font size selection followed by color selection. Once a user is finished with the floating object it may be closed by the user. According to embodiments, the floating object is a lightweight display object in that it is dismissed from display when it detects that a user no longer requires its functions.

According to an embodiment of the invention, the opacity of the displayed floating object is a function of the distance between the electronic pointer and the position of the displayed floating object. As an electronic pointer, for example, mouse pointer, is moved away from the displayed floating object, the displayed floating object becomes gradually more translucent so as to visually deemphasize the importance of the floating object to the changing position of the pointer.

These and other features and advantages, which characterize the present invention, will be apparent from a reading of the following detailed description and a review of the associated drawings. It is to be understood that both the foregoing general description and the following detailed description are explanatory only and are not restrictive of the invention as claimed.

DETAILED DESCRIPTION

As briefly described above, embodiments of the present invention are directed to a floating command object (hereafter "floating object" or "command object") that provides a small set of commonly and frequently used functionality commands in close proximity to a text or data entry/editing point. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
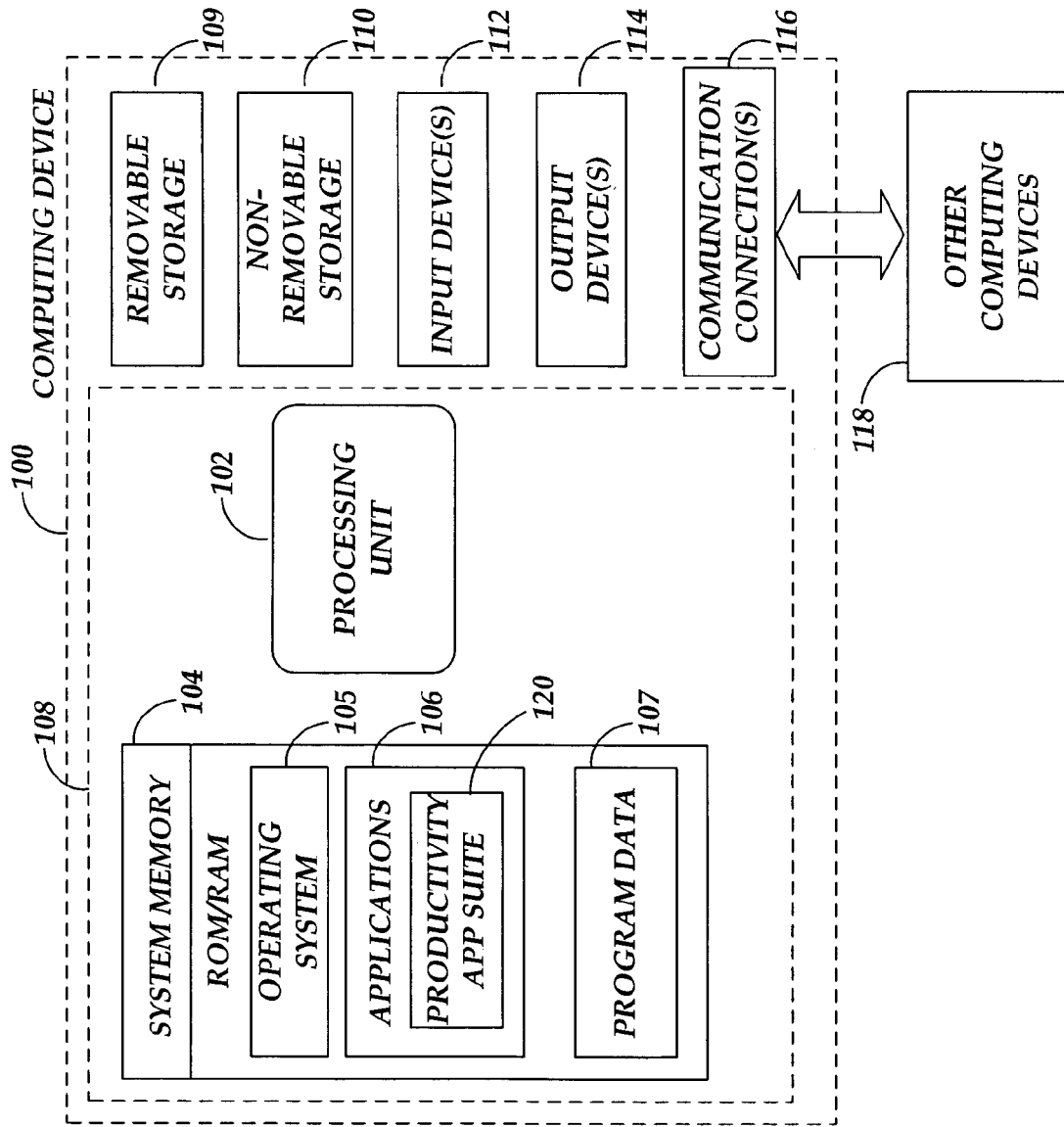
FIG. 1 illustrates an exemplary computing operating environment for embodiments of the present invention.

Referring now to the drawings, in which like numerals refer to like elements through the several figures, aspects of the present invention and an exemplary computing operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Embodiments of the invention may be implemented as a computer process (method), a computing system, or as an article of manufacture, such as a computer program product or computer readable media. The computer program product may be a computer storage media readable by a computer system and encoding a computer program of instructions for executing a computer process.

With reference to FIG. 1, one exemplary system for implementing the invention includes a computing device, such as computing device 100. In a basic configuration, the computing device 100 typically includes at least one processing unit 102 and system memory 104. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS operating systems from MICROSOFT CORPORATION of Redmond, Wash. The system memory 104 may also include one or more software applications 106, and may include program data 107. This basic configuration is illustrated in FIG. 1 by those components within dashed line 108.

In one embodiment, the application 106 may comprise many types of programs, such as an electronic mail program, a calendaring program, an Internet browsing program, and the like. According to an embodiment of the present invention, a multiple-functionality software application 120 is illustrated for providing many types of functionalities. The multiple-functionality application 120 may include a number of program modules, such as a word processing program, a spreadsheet program, a slide presentation program, a database program, and the like. An example of such a multiple-functionality application 120 is OFFICE manufactured by MICROSOFT CORPORATION.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Figure 2:
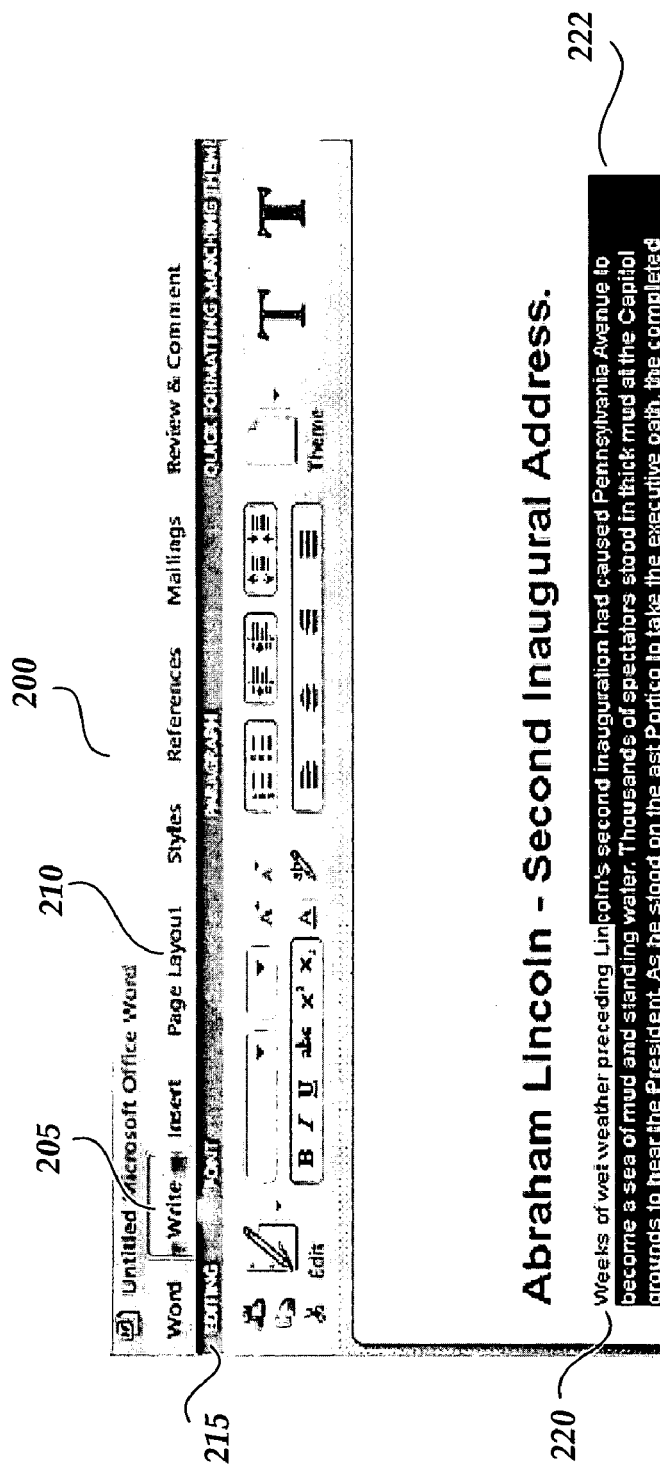
FIG. 2 illustrates a computer screen display of an example word processing user interface showing a floating object in proximity to a selected text object.

FIG. 2 illustrates a computer screen display of an example word processing user interface showing a floating object in proximity to a selected text object. As illustrated in FIG. 2, a user interface 200 of an example word processing application is provided for entering and editing a text selection 220. The user interface 200 includes a variety of task-related controls such as the writing tab 205, the page layout control 210, the insert tab, the styles tab, etc. A command bar or ribbon 215 is provided underneath the task-related controls for providing a number of functionality controls related to a selected task-related control. For example, the command ribbon 215 illustrated in FIG. 2 includes a number of functionality controls related to the writing tab 205. As should be appreciated by those skilled in the art, the user interface 200 illustrated in FIG. 2 is for purposes of example only and is not restrictive of the numerous types and layouts of user interfaces that may be used according to embodiments of the present invention. For example, the user interface 200 is illustrative of a user interface for other software applications such as spreadsheet applications, slide presentation applications, database applications, desktop publishing applications, and the like.

Referring still to FIG. 2, a portion 222 of the text selection 220 has been selected for some type of text editing, for example, the application of formatting properties to the selected text. As is well known to those skilled in the art, a text selection, such as the portion of text 222, may be selected for editing by placing a pointing device, such as a mouse pointer, at a desired location in a document. Once the pointing device is selected, for example, mouse or touch pad click, an insertion point is established in the text selection. A portion of text 222 may be selected for editing by dragging the pointer over the desired portion 222. As should be appreciated, other suitable means for selecting a portion of text or other object for editing may be used according to embodiments of the invention, for example, double mouse-clicking after location of a pointing device. Once the portion of text or other object is selected, various functionalities may be applied to the selected portion of text or object, for example, formatting property application, cut/copy/move operations, etc.

Once a portion 222 of text is selected for some type of editing, the floating object 225 automatically deploys over the document in close proximity to the selected object. As should be appreciated, deployment of the floating object 225 for the selected text object illustrated in FIG. 2 is for purposes of example only. The floating object of the present invention may be automatically deployed in proximity to a variety of selected objects. For example, the floating object may be deployed for providing functionality in association with text objects, image objects, data objects, etc. In addition, the floating command object 225 may be deployed as an opaque object, as illustrated in FIG. 3, or alternatively, the floating object may be deployed in a semi-transparent manner.

According to embodiments of the present invention, the floating object 225 is displayed in a consistent location relative to the pointer location in the selected object. For example, the floating object may always be displayed immediately above a selected object, immediately beneath a selected object, immediately to the right of a selected object, or immediately to the left of a selected object in close proximity to the final position of the pointer during object selection. By displaying the floating object 225 in consistent locations relative to a selected object and relative to the pointer, predictability is developed which allows the user to be very efficient in using the floating object. For example, if a user learns that the floating object always deploys immediately beneath and to the right of the pointer and selected object, the user will develop muscle memory that allows the user to successfully move the pointer into the deployed floating object without excess thought or excess physical movement. As should be appreciated, depending on the location of the pointer and selected object, the location of the floating object may be deployed in a slightly different location from a normal location. For example, if the floating object is normally deployed immediately beneath and to the right of the pointer and selected object, and the pointer is located in a position that does not allow space for deploying the floating object in the usual location, the floating object may be deployed in a different location, for example, above and to the left of the pointer and selected object.

Figure 3:
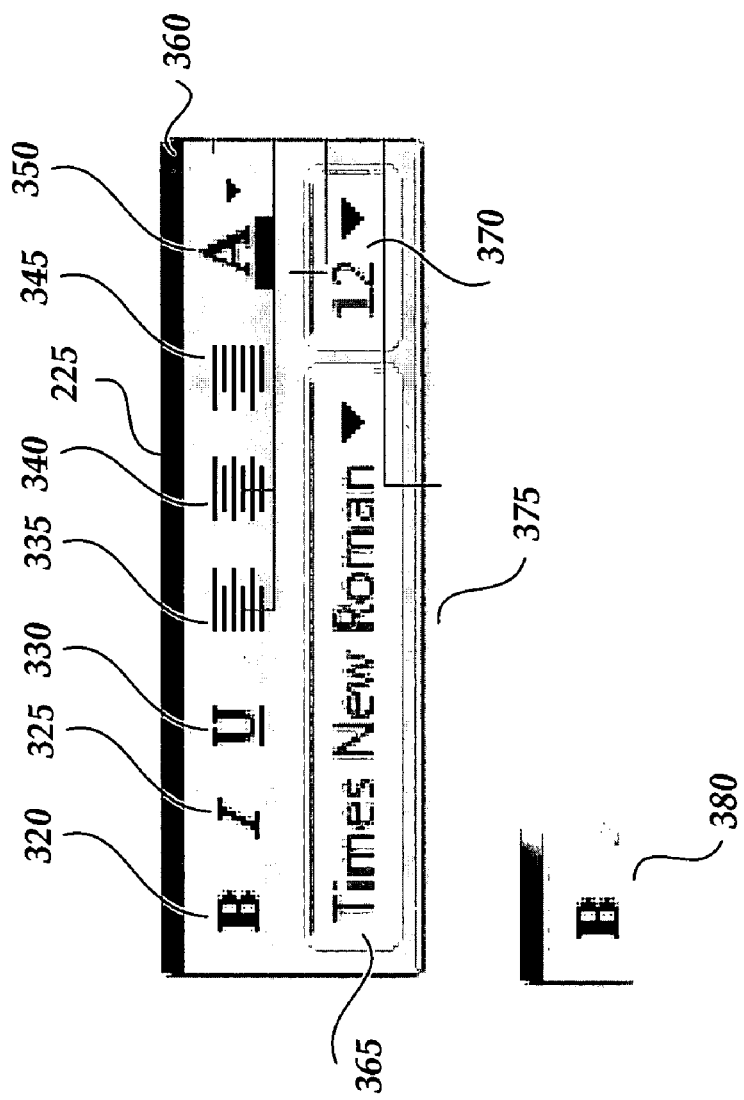
FIG. 3 illustrates a computer screen display of a floating object according to embodiments of the present invention.

Referring now to FIG. 3, according to embodiments of the present invention, the floating object 225 contains a subset of commands available from the software application in use that are contextually relevant to the current selection. For example, the floating object 225 illustrated in FIG. 3 contains commands relevant to applying formatting properties to a selected text object. For example, the floating object 225 includes a boldface command 320, an italics command 325, an underlining command 330, a left text justified command 335, a centered text command 340, a right text justified command 345, a color command 350, a font type command 365 and a font size command 370. As should be appreciated, selection of a command such as the font type command 365 may cause a drop-down menu that is deployed beneath the floating object 225 for allowing selection of one of a number of font styles. Similarly, selection of the font size command 370 may cause a drop-down menu to allow selection of one of a number of different font sizes. In addition, the commands typically included in the floating object 225 are only those commands that allow for modification of the selected object without requiring the user to launch or display a secondary user interface.

As should be appreciated, if the floating object 225 is deployed relative to a different type of object, for example, a picture object, the floating object may have a different set of commands, for example, commands commonly and frequently used for applying formatting or editing properties to a selected picture object. Likewise, a floating object 225 deployed in response to the selection of a table object in a spreadsheet document may be populated with commands commonly and frequently used for editing or applying formatting properties to data contained in a table object.

In order to prevent the floating object 225 from occupying too much space on the associated user interface 200, selectable controls inside the floating object may be made as small as possible. The visual representations of controls in the floating object preferably closely resemble corresponding visual controls contained in the command bar or ribbon 215 illustrated in FIG. 2. The floating object handle 316 allows for dragging the floating object to a different location in a document. For example, if the floating object is displayed over a portion of text or data, and the user needs to see the text or data covered by the floating object, the user may drag the floating object to a different location to uncover the text or data.

Referring still to FIG. 3, according to another embodiment, a floating object masking control 380 may be deployed upon initial selection of a text or data object before display of the entire floating object 225. Display of the masking control 380 informs a user of the presence and availability of the floating object 225 without actually displaying the floating object 225. According to this embodiment, if the user desires a display of the entire floating object 225, the user may select the masking control 380, and the entire floating object 225 will be displayed, as illustrated in FIGS. 2 and 3. As with the entire floating object 225, the masking control 380 will be displayed in a consistent location in close proximity to the pointer and selected object.

Figure 4:
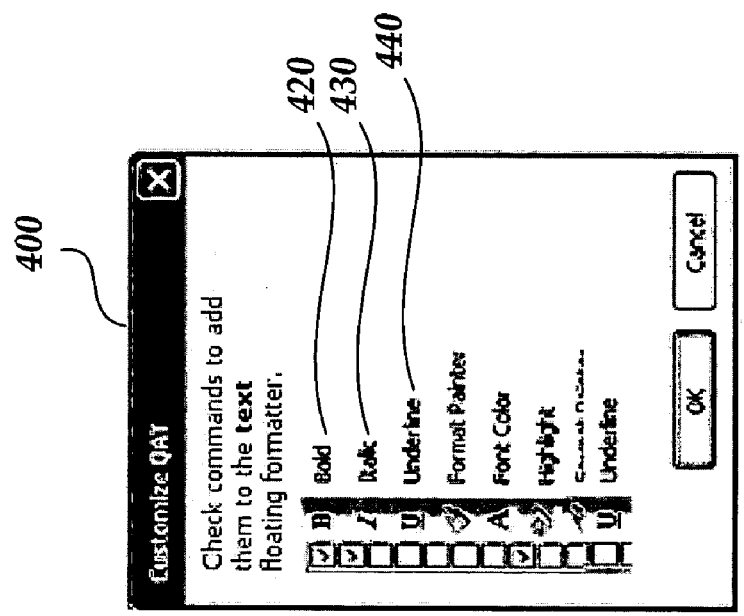
FIG. 4 illustrates a computer screen display of a user interface for customizing functionality controls contained in a floating object.

FIG. 4 illustrates a computer screen display of a user interface for customizing functionality commands contained in the floating object. According to embodiments of the present invention, the individual commands displayed in the floating object 225 may be customized by a user. The dialog 400 is presented with which a user may select particular functionality commands that will be populated in the floating object 225 when the object is subsequently deployed. For example, if a given user only frequently uses the bold function, the italics function and the underline function, a user may customize the floating object 225 to only have those commands in the floating object. On the other hand, if a different user uses the font color command on a frequent basis, the font color command may be checked from the checklist in the dialog 400 for adding that command to the floating object 225.

Figure 5:
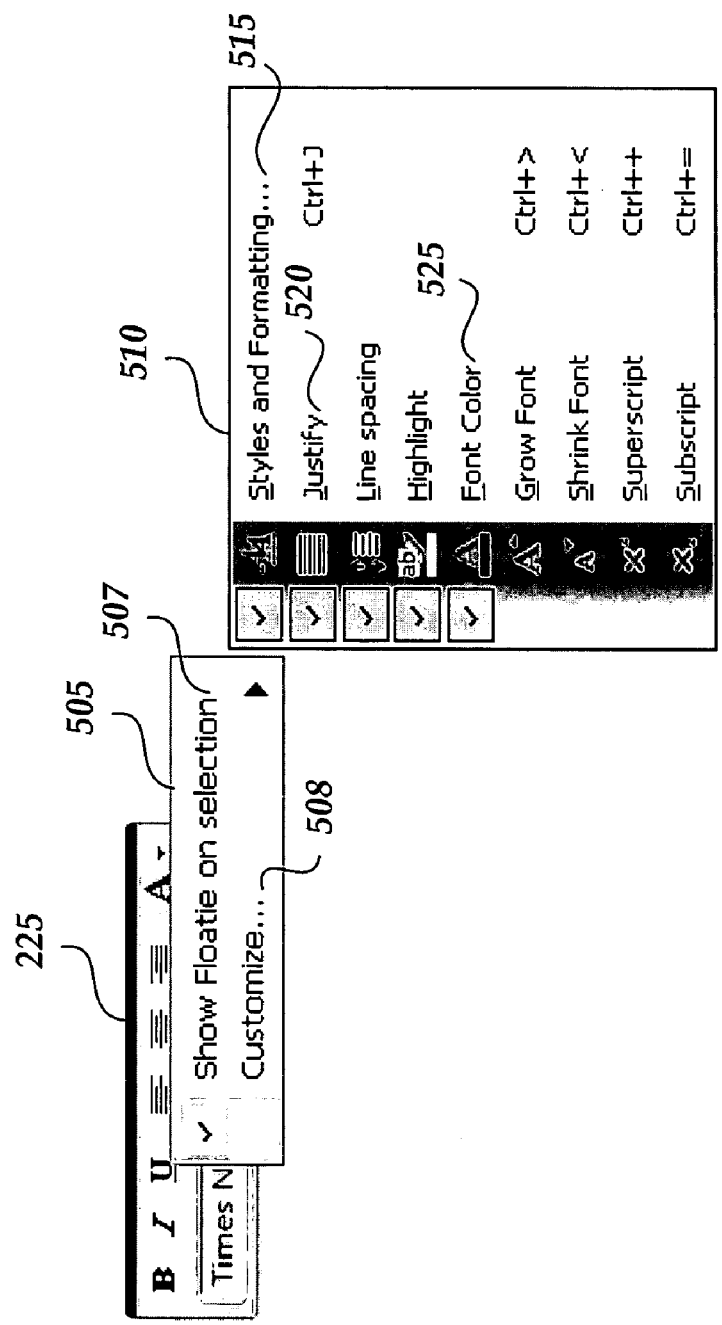
FIG. 5 illustrates a computer screen display of a user interface for controlling display of and for customizing functionality controls contained in a floating object.

Referring to FIG. 5, according to another embodiment, a pop-out dialog 505 may be deployed for enabling or disabling the floating object 225 by selecting the "show floatie on selection" control 507. That is, by de-selecting the "show floatie on selection" control 507, the floating object 225 will be disabled from subsequent deployment. Additionally, the "customize" control 508 may be selected to display a pop-out menu 510 from which a user may select commands from a list of available commands that will be populated in the floating object 225 upon subsequent deployment.

If a user selects a very limited set of commands for populating the floating object 225, the size of the floating object 225 may be reduced when it is displayed. According to one embodiment, if the combined contents of the floating object are narrower than a prescribed width, for example, 200 pixels, the floating object may be rendered as a single-line object, as opposed to the two-line object illustrated in FIGS. 2 and 3. On the other hand, if a given user adds functionality commands to the floating object 225 such that the object exceeds a prescribed width, for example, 200 pixels, then the contents of the floating object may be wrapped to a second line as illustrated in FIGS. 2 and 3. If additional commands are added to the floating object requiring more than two lines of content, additional lines of content may be dynamically added.

Figure 6:
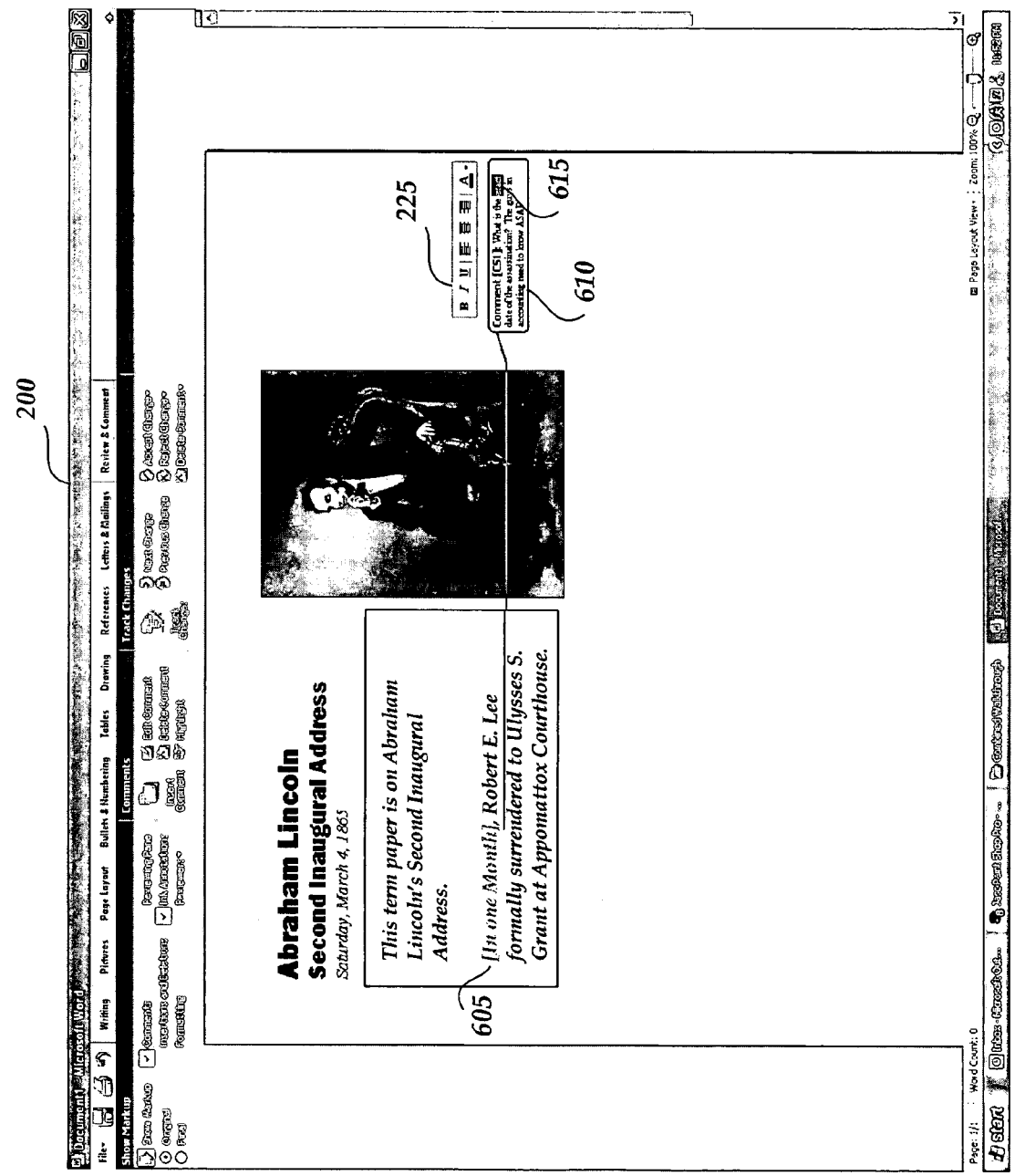
FIG. 6 illustrates a computer screen display showing the use of a floating object for editing a comment applied to a word processing document.

According to embodiments of the present invention, the floating object 225 may be deployed at any location in a document at which a user may place a cursor or pointer for selecting an object for editing. For example, FIG. 6 illustrates a computer screen display showing the use of a floating object for editing a comment applied to a word processing document. As illustrated in FIG. 6, a comment function is in use for adding a comment 610 to a text selection 605 in a word processing document. If a user selects a text or data object 615 in the comment 610, the floating object 225 may be deployed in close proximity to the pointer position in the comment 610 for allowing formatting or other properties to be applied to the selected object in the comment 610.

Figure 7:
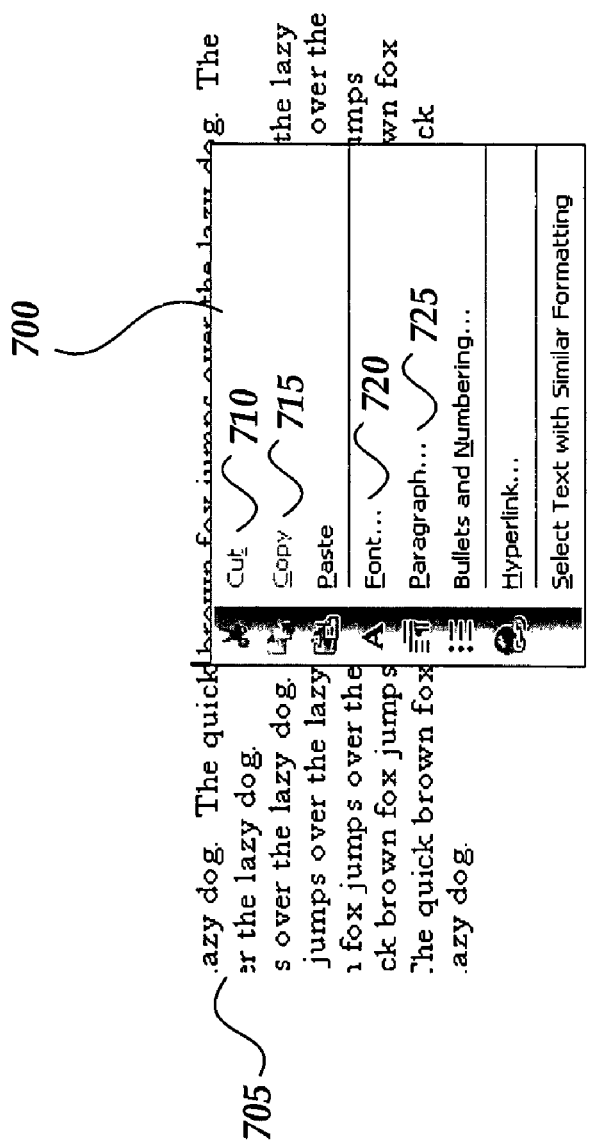
FIG. 7 illustrates a computer screen display showing the selection of floating object functions from a deployed contextual menu.

Referring now to FIG. 7, a context menu 700 is illustrated relative to a text selection 705. As is known to those skilled in the art, a context menu may be deployed relative to a selected object for providing various functionalities for application to the selected object. The example context menu 700 may be deployed through some user action, for example, right-clicking on a mouse device, after selection of a given text, data or other object. According to typical context menus, selection of a given command from the context menu causes the associated functionality to be applied to the selected object and causes a simultaneous closing of the context menu 700.

According to embodiments of the present invention, if a user selects a command from the context menu 700 that is available in the floating object for the selected object, the functionality associated with the selected command is applied to the selected object, and simultaneously, the floating object containing the selected command will be displayed, and the contextual menu 700 will be closed. By displaying the floating object 225 in response to selecting a command from the contextual menu 700, the user is provided other related formatting functions, for example, boldfacing, italics, and the like, available in the floating object 225 that the user will have grown accustomed to seeing in the floating object 225 in association with the command selected by the user from the contextual menu 700. Once the floating object is deployed by selecting a command from the contextual menu 700, the floating object is positioned and performs in the same manner as described above.

Figure 8:
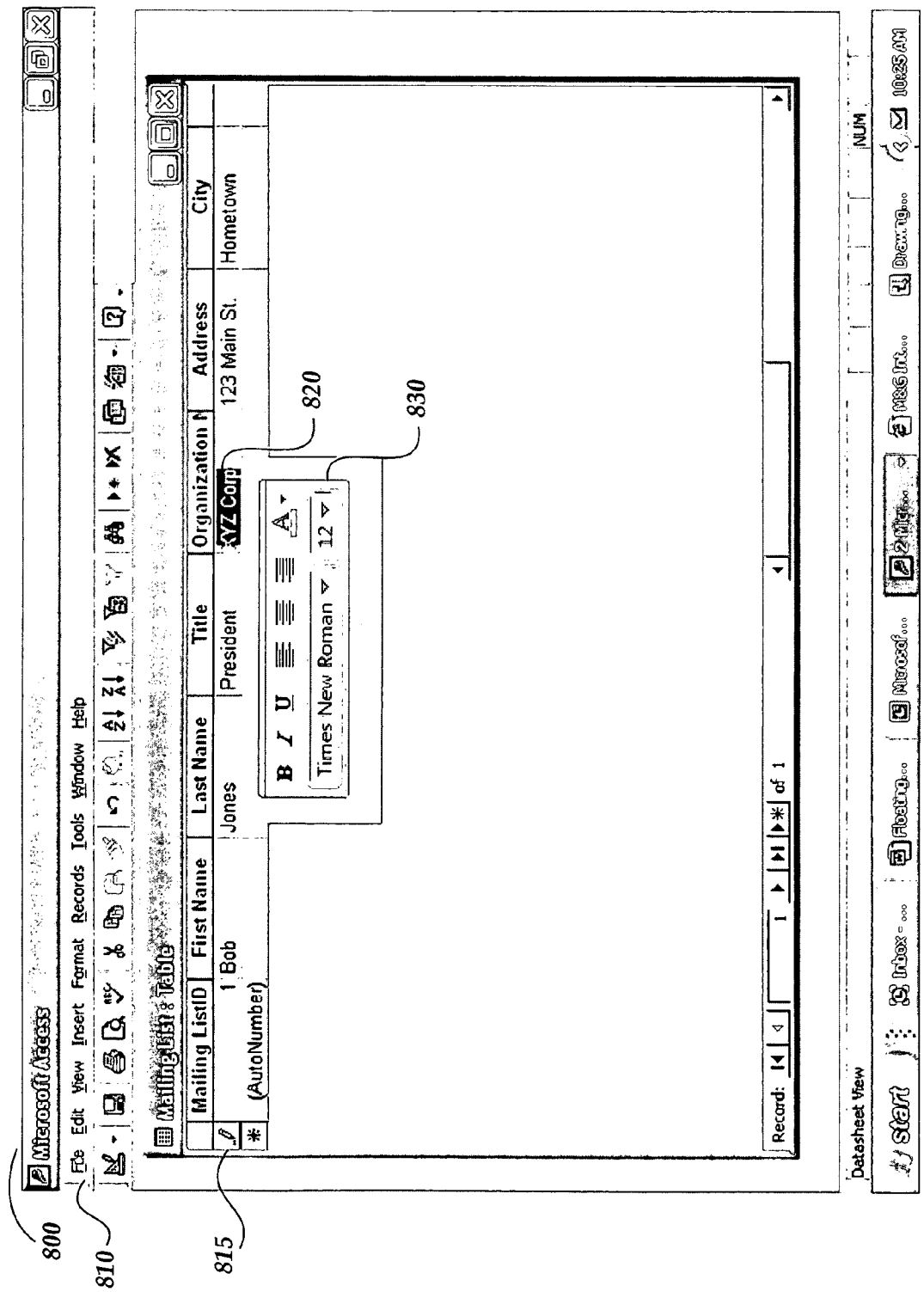
FIG. 8 illustrates a computer screen display showing the use of a floating object for applying properties to a database entry.

As briefly described above, floating objects 225 may be utilized with respect to a variety of software applications, for example, word processing applications, spreadsheet applications, slide presentation applications, database applications, desktop publishing applications, and the like. For example, referring to FIG. 8, utilization of a floating object in the context of a database application is illustrated. As shown in FIG. 8, a user interface 800 for a database application is provided. A toolbar 810 provides a number of commands for obtaining functionalities available from the associated database application. According to embodiments of the present invention, a floating object 830 is displayed in close proximity to a selected data object 820. As should be appreciated, the commands populating the floating object 830 may include additional or different commands commonly used for selected objects in the database user interface. For example, instead of the commands illustrated in the floating object 830, other commands related to database applications, for example, filtering commands and sorting commands, may be populated in the floating object 830 by default or by customization, as described above with reference to FIGS. 4 and 5.

According to embodiments of the present invention, when the floating object 225, 830 is deployed by selection of an object for editing, the floating object 225, 830 remains displayed in proximity to the selected object until the floating object is dismissed by user action. That is, once the user has utilized all desired commands from the floating object, the user may selectively close the display of the floating object. Closing the floating object is made a relatively easy operation for the user. If the user moves the mouse pointer away from the floating object more than a prescribed distance, the floating object is closed. Similarly, if the user moves the pointer or cursor to a different location in the document and selects, for example, mouse clicks, at a different location, the floating object is dismissed from its present location and is redeployed at the new location, if applicable. Additionally, if a user utilizes a scrolling mechanism on the mouse device or touchpad, or if the user enters additional text or data through typing, voice recognition, or other mechanism, the floating object is dismissed.

Figure 9:
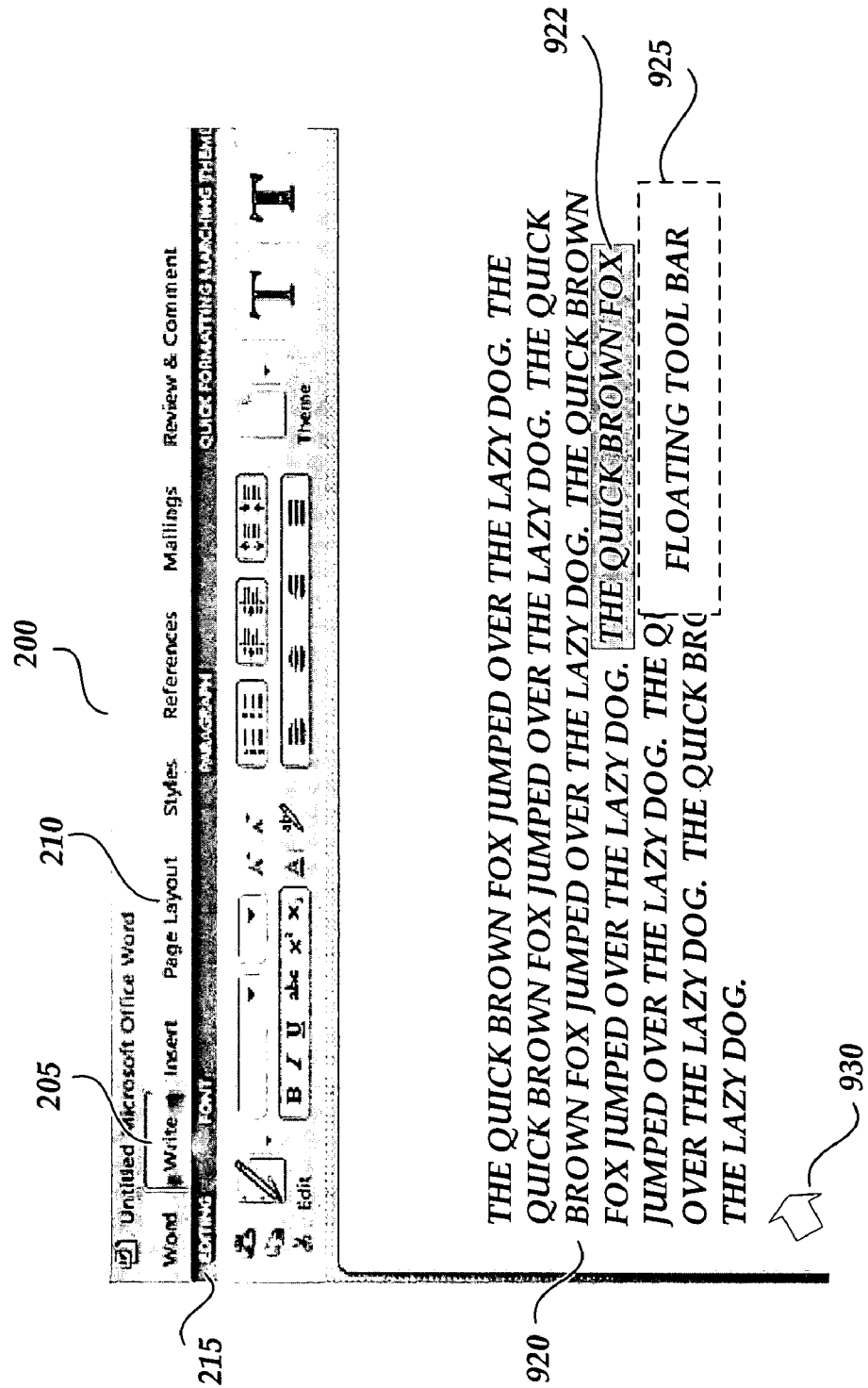
FIG. 9 illustrates a computer screen display showing the translucent display of a floating object as an electronic pointer is moved away from the displayed floating object.

As illustrated in FIGS. 2 and 3 above, the visual presentation of the floating object 225 is an opaque display that covers underlying text or data when the floating object is displayed in a given user interface 200, 800. However, according to embodiments of the present invention, the opacity of the visual display of the floating object 225, 830 is a function of the distance between the displayed floating object and the mouse or touchpad pointer. As illustrated in FIG. 9, a floating object 925 is displayed in proximity to a text selection 920 for applying one or more functions, for example, formatting properties, to the selected text object 922. As the mouse pointer 930 is moved away from the floating object 925, the display of the floating object 925 gradually becomes increasingly translucent. If the pointer is moved a prescribed distance away from the displayed floating object, the floating object 925 will become virtually invisible to the user.

According to one embodiment, if the user moves the pointer back toward the floating object 925, the floating object 925 will become less translucent as the pointer is moved closer to the displayed floating object. By making the floating object gradually more translucent as the pointer moves away from the floating object, a user is provided a visual representation that the importance of the functions displayed in the floating object are deemphasized relative to the present position of the pointer. That is, as the pointer is moved a distance away from the selected object 922, the need for the functionality displayed in the floating object 925 relative to that selected object is less important.

Figure 10:
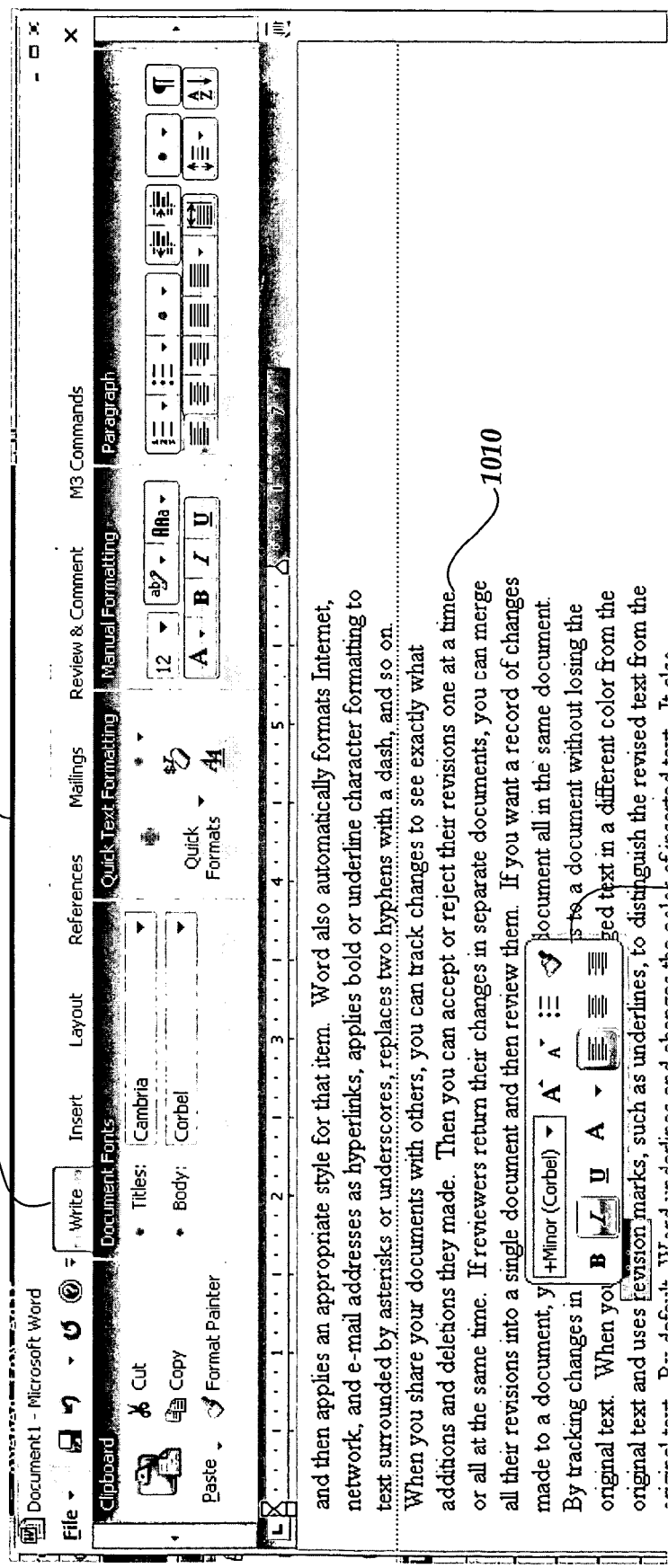
FIG. 10 illustrates an alternate layout of a floating object according to embodiments of the present invention.

Referring now to FIG. 10, an alternate visual layout of a floating command object 1025 is illustrated. As shown in FIG. 10, the alternate layout of the floating object 1025 includes two lines of buttons or controls for selecting one or more functionalities. As should be appreciated, many different layouts of buttons and controls and many different colors and object shapes may be used for the floating object and for visual properties of the floating object.

As described herein, a floating command object is provided for offering a set of commonly or frequently used commands in close proximity to a selected text, data or other object in a document. It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

The invention claimed is:

1. A method of providing a floating command object that is contextually relevant to selected text, the method comprising:
   upon receiving a selection of text in an electronic document for editing, displaying a command object adjacent to the selected text such that at least a portion of the selected text remains visible, the command object providing text editing functionality in response to the selection of the text;
   displaying in the command object a set of functionality commands that are relevant to editing the selected text, the set of functionality commands being a subset of a broader range of functionality commands available for editing the selected text, wherein displaying in the command object the set of functionality commands comprises displaying the set of functionality commands with a first set of visual representations similar to a second set of visual representations associated with displaying the broader range of functionality commands;
   associating an opacity of the displayed command object to a distance between an electronic pointer and the displayed command object; and
   continuing to display the command object after receiving a selection of one of the set of functionality commands.

2. The method of claim 1, wherein displaying in the command object the set of functionality commands that are relevant to editing the selected text includes displaying the set of functionality commands for applying a formatting property to the selected text.

3. The method of claim 1, wherein continuing to display the command object includes maintaining the command object in its displayed position relative to the selected text until the display of the command object is closed by a user action.

4. The method of claim 1, in response to receiving a selection of another object for editing, closing the display of the command object from its display position relative to the previously selected text.

5. The method of claim 4, further comprising displaying the command object at a second display position relative to the other object such that the other object remains visible.

6. The method of claim 1, upon receiving an entry of data into a document containing the text, closing a display of the command object.

7. The method of claim 1, in response to receiving an indication of a user moving the electronic pointer away from the displayed command object, causing the displayed command object to grow increasingly translucent as the distance between the electronic pointer and the displayed command object increases.

8. The method of claim 1, wherein displaying the command object adjacent to the selected text includes displaying the command object adjacent to an editing insertion point in the selected text.

9. The method of claim 8, wherein displaying the command object adjacent to the editing insertion point in the selected text includes displaying the command object adjacent to a cursor location in the selected text.

10. The method of claim 8, further comprising displaying the command object in a consistent location relative to the selected text upon subsequent displays of the command object.

11. The method of claim 10, wherein displaying the command object in the consistent location relative to the selected text upon subsequent displays of the command object includes displaying the command object in a position that is one of: beneath the selected text and above the selected text.

12. The method of claim 1, further comprising displaying the command object in response to a selection of one of: data and an image, the command object being further associated with editing the selected one of: the data and the image.

13. The method of claim 10, wherein displaying the command object in the consistent location relative to the selected text upon subsequent displays of the command object includes displaying the command object in a position that is one of: on a right side of the selected text and on a left side of the selected text.

14. The method of claim 1, further comprising enabling the user to select any one of the set of functionality commands from the command object while the command object is being displayed.

15. A computer storage medium containing computer executable instructions which when executed by a computer perform a method of providing a command object that is contextually relevant to a selected portion of text within an electronic document, the method executed by the set of instructions comprising:
   upon receiving a selection of a first portion of text in an electronic document for editing, displaying a command object adjacent to the selected first portion of text such that at least a portion of the selected first portion of text is not covered by the command object, the command object providing text editing functionality in response to the selection of the first portion of text;

displaying in the command object a set of functionality commands that are relevant to formatting the selected first portion of text, the set of functionality commands being:

derived from a subset of available formatting commands for the document, the subset of available formatting commands being displayed in a main user interface portion of the electronic document, displayed with visual representations similar to the subset of available formatting commands displayed in the main user interface portion, and configured to be applied to the selected first portion of text;

receiving a selection of one of the functionality commands from the command object for application of an associated functionality to the first portion of text without closing a display of the command object;

associating an opacity of the displayed command object to a distance between an electronic pointer and the displayed command object; and continuing to display the command object after receiving a selection of one of the set of functionality commands.

16. The computer storage medium of claim 15, in response to receiving a selection of a second portion of text for formatting, further comprising:

closing the display of the command object from the first display position relative to the first portion of text; and displaying the command object at a second display position relative to the second portion of text.

17. A display device having rendered thereon an improved user interface with functionality from a software application that is relevant to selected text, the user interface comprising:

a floating object having disposed therein a subset of functionality commands available from the software application that are relevant to editing the selected text in an electronic document, the subset of functionality commands being displayed in a main user interface of the software application and, when disposed in the floating object, having a first visual representation in the floating object similar to a second visual representation in the main user interface, wherein each functionality command within the subset of functionality commands is configured to be selected for applying at least one property to the selected object without requiring a display of a secondary user interface, the at least one property corresponding to text editing functionality;

wherein the floating object is operative to display in the electronic document adjacent to the selected text upon receiving a selection of the selected text such that at least a portion of the selected text remains visible;

wherein the floating object is displayed translucently based on an opacity associated with a distance between an electronic pointer and the floating object; and continuing to display the command object after receiving a selection of one of the set of functionality commands.

18. The display device of claim 17, wherein the display of the floating object is increasingly translucent as the distance between the electronic pointer and the displayed floating object increases.

\* \* \* \* \*